United States Patent
Cao et al.

(10) Patent No.: US 8,812,029 B1
(45) Date of Patent: Aug. 19, 2014

(54) AUTOMATED USER CHECK-IN UTILIZING MOBILE COMPUTING DEVICES

(75) Inventors: Yang Cao, Campbell, CA (US); Ryan Kazda, Seattle, WA (US); Sanam Mehta, Sammamish, WA (US); Bret Moore, Seattle, WA (US); Owyn Richen, Seattle, WA (US); John Siu, Renton, WA (US)

(73) Assignee: Whitepages, Inc., Seattle, WA (US)

( * ) Notice: Subject to any disclaimer, the term of this patent is extended or adjusted under 35 U.S.C. 154(b) by 282 days.

(21) Appl. No.: 13/444,544

(22) Filed: Apr. 11, 2012

(51) Int. Cl.
*H04M 1/38* (2006.01)

(52) U.S. Cl.
USPC .......... 455/456.3; 455/456.1; 455/456.5; 455/456.6; 455/457

(58) Field of Classification Search
CPC ......... H04W 64/00; H04W 4/02; H04W 4/06; H04W 4/025; H04W 4/028
USPC ........... 455/414.2, 414.3, 456.1–456.6, 404.2
See application file for complete search history.

(56) References Cited

U.S. PATENT DOCUMENTS

| | | | | |
|---|---|---|---|---|
| 8,200,247 | B1 * | 6/2012 | Starenky et al. | 455/456.3 |
| 2012/0123871 | A1 * | 5/2012 | Svendsen et al. | 705/14.67 |
| 2012/0124176 | A1 * | 5/2012 | Curtis et al. | 709/219 |
| 2012/0209685 | A1 * | 8/2012 | Nealer et al. | 705/14.25 |
| 2012/0252418 | A1 * | 10/2012 | Kandekar et al. | 455/414.1 |
| 2013/0073422 | A1 * | 3/2013 | Moore et al. | 705/26.7 |

OTHER PUBLICATIONS

Ionescu, Daniel, "Google Latitude Adds Leacterboard Game-like Check-ins", PCWorld, Feb. 20, 2012, 3 pages.
Kong, Cecillia, "Foursquare founder Selvadurai talks about privacy, future", Post-Tech, The Washington Post, Apr. 8, 2011, 4 pages.
O'Dell, Jolie, "A Field Guide to Using Facebook Places", Mashable.com, Aug. 19, 2012, 23 pages.
Balez, Mat, "Google Latitude, Now for iPhone", printed from http://googlemobile.blogspot.com/2009/07/google-latitude-now-for-iphone.htm, Jul. 23, 2009, 20 pages.
Mills, Elinor, "Google Ups Ante in Mapping Rivalry", CNET News, Jul. 25, 2005, 7 pages.
U.S. Appl. No. 13/444,512, filed Apr. 11, 2012.
U.S. Appl. No. 13/444,569, filed Apr. 11, 2012.

* cited by examiner

*Primary Examiner* — Nathan Mitchell
*Assistant Examiner* — Dung Lam
(74) *Attorney, Agent, or Firm* — K&L Gates LLP

(57) ABSTRACT

Various embodiments are directed to systems and methods for checking in at a business with a mobile computing device. For example, the mobile computing device may receive via a data network, location information for a venue. The mobile computing device may also determine whether a location of the mobile computing device is available. Conditioned upon the location of the mobile computing device being available, the mobile computing device may determine whether the location of the mobile computing device is within a threshold distance of the venue. Conditioned upon the location of the mobile computing device being within the threshold distance of the venue, the mobile computing device may send a check-in message to a server. The check-in message may indicate that the user of the mobile computing device is at the venue.

20 Claims, 22 Drawing Sheets

AUTOMATED USER CHECK-IN UTILIZING MOBILE COMPUTING DEVICES

BACKGROUND

The proliferation of smart phones, tablet computers and other network-enabled mobile computing devices has generated demand for applications, or "apps" that provide users with various information and/or services. Apps may provide mobile computing device users with games, social networking, news alerts, travel and/or traffic-related alerts, etc. Many apps are available for download at central distribution server systems. For example, each of the current major mobile computing device platforms (APPLE I/OS and GOOGLE ANDROID) has a separate app distribution service (i.e., the APPLE APPSTORE, the ANDROID MARKET).

As the distribution and use of mobile computing device apps has become prevalent, businesses have begun to generate and distribute apps, for example, to generate advertising revenue and/or to steer potential customers towards the businesses. There is a continuing need for new mobile computing device apps. As a result mobile device users are provided with an ever-increasing range of app-related business and other services. There remains a need, however, for apps designed to provide mobile computing device users with location-based information about businesses and other venues.

SUMMARY

Various embodiments of the present invention are directed to systems and methods for the provision of location-based venue information to mobile computing devices, such as, for example, smart phones, tablet computers, etc. The mobile computing devices may be owned by and/or under the control of a person (referred to herein as a user). The user may initiate some searches and view results. The user may be provided with an application or "app" that may be executed by the user's mobile computing device. In some embodiments, information about various venues may be stored at an application server system remote from the mobile computing device and provided to the user via the mobile computing device in response to user-initiated and/or automated searches.

Upon execution of the app, the mobile computing device may obtain and present the user with location-based information in many different contexts. For example, in some embodiments, the mobile computing device may be programmed (e.g., by the app) to determine a neighborhood corresponding to a location of the mobile computing device. The neighborhood is a geographic area describing the location of the mobile computing device. Neighborhoods may or may not be geographically contiguous. The location of the mobile computing device may be determined according to any suitable hardware and/or software-based capabilities of the device. For example, the mobile computing device may determine its location using a Global Positioning System (GPS) of the device, a compass and/or gyroscope of the device, a triangulated position received from a mobile telecommunications network provider, a WiFi or other mobile-related network identifier (e.g., Internet Protocol (IP) address), etc. In some embodiments, the mobile computing device may determine its location based on input received from the user. After determining a neighborhood, the mobile computing device may facilitate searches for businesses and other venues using the determined neighborhood as a search parameter. In this way, results of the searches may be tailored to the user's neighborhood.

Venues may include any locations where the user may desire to travel. Venues may include businesses offering particular products or services, such as, for example, retail stores, restaurants, bars, auto repair shops, etc. Venues may also include other locations of interest that are not formally in business including, for example, non-profits, public parks where certain events may be occurring, etc. In some embodiments, venues also include private residences.

According to various embodiments, the app may cause the mobile computing device and application server system to generate and/or display search results based on a geographic search center. The geographic search center may be determined based on a current or past location of the mobile computing device and/or user input. For example, the user may initiate a search for venue information and, in doing so, may indicate a geographic search location as a search parameter. If the search location is more than a threshold distance from a location of the mobile computing device, or if the location of the mobile computing device is unavailable, then the search location may be set as the geographic search center. If the search location is less than the threshold distance from the location of the mobile computing device, then the location of the mobile computing device may be set as the geographic search center. In various embodiments, venues returned by the search may be displayed to the user, for example, in order based on the distance between each venue and the geographic search center and may indicate a distance between each venue and the geographic search center. Also, in some embodiments, the geographic search center may be utilized as a search location for subsequent searches.

In some embodiments, the app may use the neighborhood and/or geographic search center, as described above, to provide the user of the mobile computing device with an indication of a trending venue or venues. Trending venues may be venues selected based on the activities of venue patrons. Trending venues may be identified by the application server system, for example, based on trending data describing venue patron activity. The trending data may be received from a location-based social networking system, site or service such as, for example, FOURSQUARE, FACEBOOK PLACES, GOOGLE LATITUDE, or any other suitable location-based social networking site that provides real-time venue trending information. Venue trending information may be accessed and downloaded from the location-based social networking system, for example, by the application server systems. In some embodiments, a server system associated with the social networking system, site or service may determine trending venues and send a list of trending venues to the application server system. Trending searches may be initiated automatically and/or by the user. Again, trending search results may be presented, for example, based on the distance between the displayed venues and a geographic search center.

According to various embodiments, the app may also cause the mobile computing device and application server system to implement a user check-in feature. For example, a user may desire to indicate his or her presence at a particular venue. Some Internet-based services provide users with the option to check-in at a venue. Such services include, for example, FOURSQUARE, GOOGLE CHECK-INS, FACEBOOK PLACES, etc. A user may utilize the app and application server system to pre-register to check-in at a given venue even when the user is not yet present at the venue. Upon pre-registration, the mobile computing device may monitor its location (e.g., as the user travels to the selected venue) by periodically detecting its location. If the mobile computing device enters a sleep or inactive mode, the app may activate the device in order to detect its location (e.g., by activating the processor). When the mobile computing device is within a predetermined distance from the business, it may submit a check-in request to an Internet-based check-in service. The request may bring about a check-in of the user at the business. The check-in request may be sent to the application server system or, in various embodiments, may be sent to a third-party server system implementing the Internet-based check-in service to which the user is signing in. Also, it will be appreciated that, in some embodiments, the application server system itself may implement a service for which the user signs-in to a business.

FIGURES

Various embodiments of the present invention are described herein, by way of example, in conjunction with the following Figures wherein.

DESCRIPTION

Figure 1:
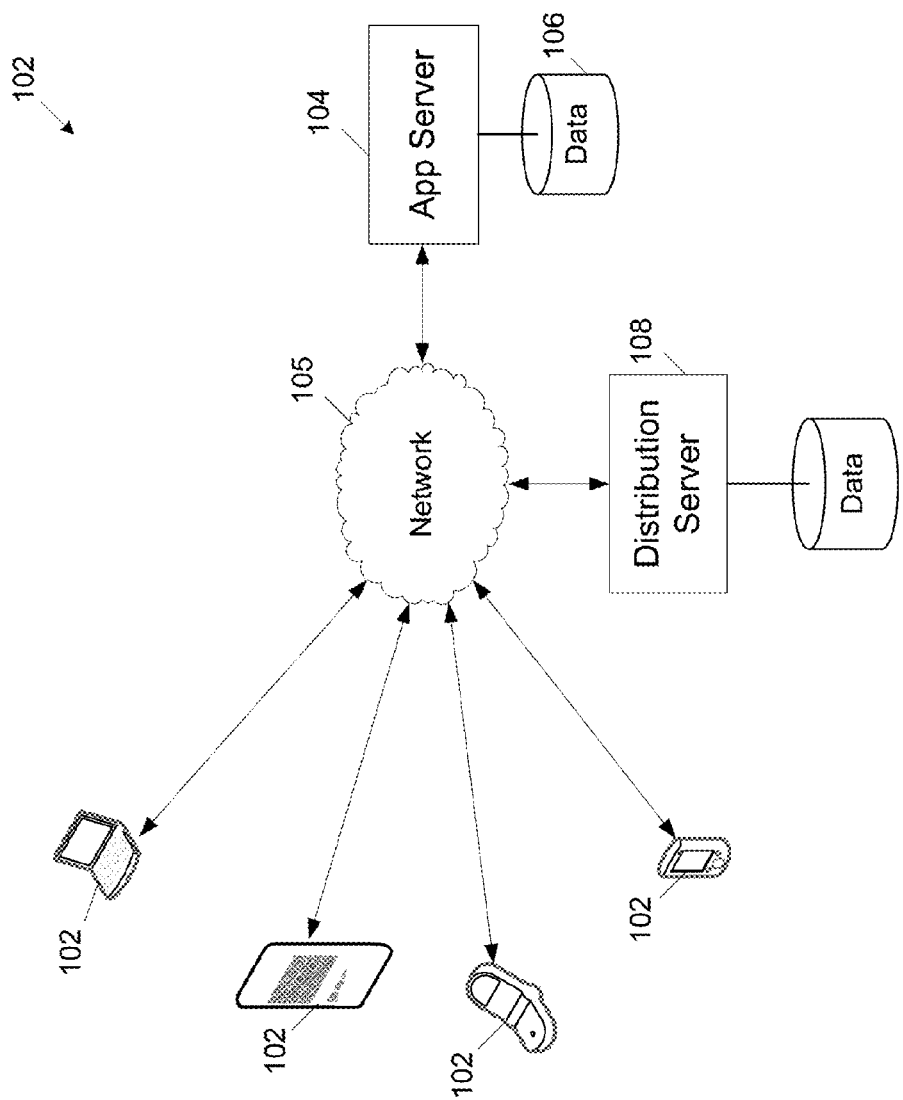
FIG. 1 is a diagram of an environment comprising a plurality of mobile computing devices in communication with a remote server.

Various embodiments of the present inventions described herein are directed to smart phone (or other mobile computing device) apps that provide location-based mobile services such as neighborhood-based searches and pre-check-in for venues. Before describing such apps in more detail, this disclosure first briefly describes some details about suitable mobile computing environments and devices that can use the apps. FIG. 1 is a diagram of an environment 100 for providing location-based venue information to various mobile computing devices 102. The environment 100 comprises the mobile computing devices 102 as well as various server systems 104, 108. The various devices and systems 102, 104, 108 may be in communication with one another via a data network 105. The data network 105 may comprise any suitable type of wired and/or wireless network and, in some embodiments, may comprise the Internet. For example, the mobile computing devices 102 may connect to the network 105 utilizing a mobile telecommunications network, a local area network (LAN), a wired connection utilizing a universal serial bus (USB) or other communications port of the mobile computing device 102, etc. The data network 105 may also be and/or comprise all or a portion of a mobile telecommunications network such as, for example, a 3G, 4G or other suitable network.

The mobile devices 102 may execute applications or apps that configure the mobile devices 102 to request, receive and display location-based venue information. For example, the mobile devices 102, upon execution of one or more apps, may receive search query parameters from the user, generate search query parameters (in some embodiments), transmit search queries to the application server system 104, receive location-based venue information from the application, etc. The application server system 104 may take various forms and may provide various data and/or services to the mobile computing devices 102. For example, the application server system 104 may be a single computer device or server. In some embodiments, the application server system 104 may comprise multiple computer devices or servers that may be at multiple geographic locations. In some embodiments, the application server system 104 may be implemented in a networked manner such as, for example, according to a cloud computing or software as a service (SaaS) model. The application server system 104 may provide various services to the mobile computing devices 102, including during the execution of some apps. Such services may include data and/or processing services to facilitate execution of the app or apps. For example, and as described in more detail below, the application server system 104 may provide location-based venue information to mobile devices 102 in response to the search queries received from the mobile devices 102.

In some embodiments, the application server system 104 may also provide the mobile devices with executables and/or other resources for implementing various apps. Alternately, some or all executables and/or other app resources may be downloaded from a distinct app distribution server system 108, which may comprise one or more servers or other computer devices and, like the application server system 104, may be implemented in a cloud or networked manner. Example distribution services include the APPLE i/OS APP STORE, the ANDROID MARKET, etc.

Figure 2:
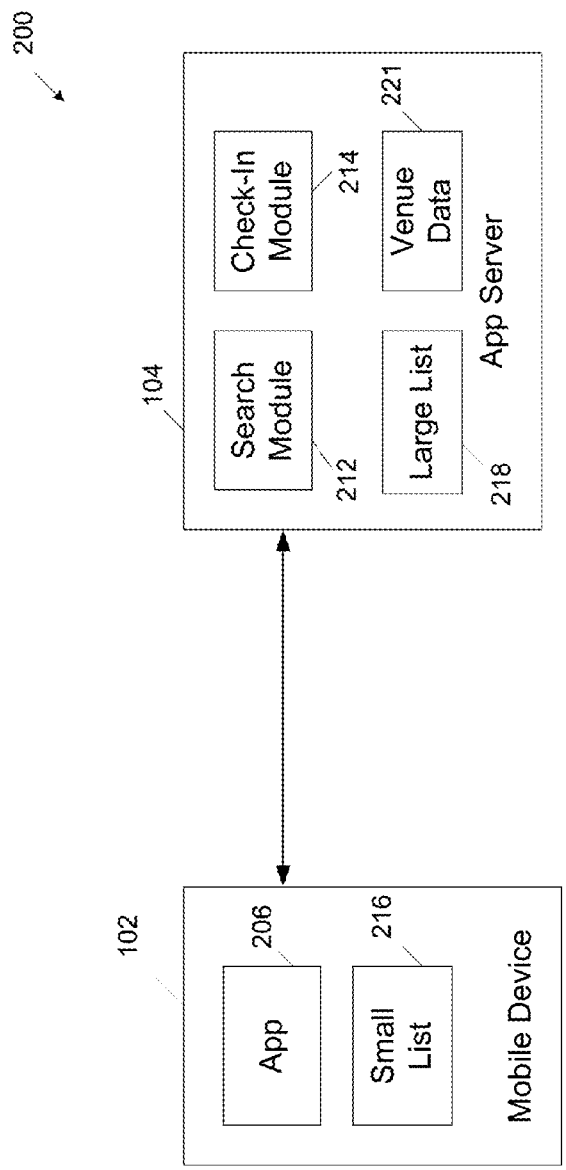
FIG. 2 is a diagram showing additional details of an example mobile computing device and the application server system of the environment of FIG. 1.

FIG. 2 is a diagram 200 showing additional details of an example mobile computing device 102 and the application server system 104 of the environment 100. The mobile computing device 102 may comprise the app 206. The app 206 may be stored at any suitable data storage location of the mobile computing device including, for example, data storage 306, memory 304, removable memory 326, etc., described in more detail below with respect to FIG. 3. In various embodiments, the app 206 may be executed by a processor or processors 306 of the mobile computing device 102, again, as described below with respect to FIG. 3. Although one app 206 is shown, it will be appreciated that implementing the functionality described herein may sometimes involve executing multiple apps. Resources for executing the app 206 (e.g., executables, data, etc.) may be downloaded to the mobile computing device 102 from the application server system 104 and/or from a separate distribution server system such as the app distribution server system 108 described herein above. The mobile computing device 102 may also comprise various other resources for executing the app 206. Such resources may also be stored at any suitable data storage location or locations as described above. For example, the mobile computing device 102 may comprise venue and/or neighborhood information that may be used by the mobile computing device 102 (e.g., in conjunction with the app 206) to generate and/or display search results. Neighborhood information stored at the mobile computing device 102, in various embodiments, may be stored in a small list 216, described in more detail below. Although only one mobile computing device 102 is shown in FIG. 2, it will be appreciated that some or all of the mobile computing devices 102 of the environment 100 may be configured as illustrated in FIG. 2.

The application server system 104 may execute one or more software modules for providing venue information to the mobile computing device 102. A search module 212 may implement various user-initiated and/or non-user initiated (e.g., automatic) searches for venue information, for example, in response to search queries received from the mobile computing device 102. A check-in module 214 may implement the check-in service utilizing information received from the mobile computing device 102, as described herein. The application server system 104 may store various data for providing venue information to the mobile computing device 102. The data may be stored, for example, at one or more data stores of the application server system 104 such as, disk drives, arrays of disk drives, tape libraries, other persistent storage devices, memory, etc., that may be located at a single location or across multiple locations. Venue data 221 stored at the application server system 104 may describe various businesses and other venues including, for example, products and services offered for sale by different businesses, attractions and/or events at businesses and other venues, etc., and, in some embodiments, neighborhoods associated with some or all of the venues. Venue data 221, in some embodiments, may be organized into a searchable database and is also referred to herein as a venue database 221.

The application server system 104 may also comprise information describing neighborhoods themselves. Neighborhoods may be defined by any suitable criteria including, for example, geographic boundaries or lists of constituent geographic units (e.g. zip codes, municipalities, etc.). In some embodiments, neighborhood data may be broken into a small list 216 and a large list 218. The small list 216, as described above, may reside on the mobile computing device 102 and may describe neighborhoods that may be used by the mobile device 102 and/or application server system 104 as search parameters. In some embodiments, the application server system 104 may also maintain a copy of the small list 216. Neighborhoods included on the small list 216 may comprise a large enough number of businesses or other venues to provide meaningful search results in most cases. For example, if there are not enough venues in a neighborhood, searches using the under-populated neighborhood as a search parameter will return few or no results. According to various embodiments, neighborhoods on the small list may contain a threshold number of venues per unit of population density. In various example embodiments, there are about 100 businesses per neighborhood. The number of businesses in a neighborhood, however, as well as the size of the neighborhoods themselves can be adjusted, for example based on the overall size of the city including the neighborhoods, the overall number of neighborhoods (e.g., in a geographic region), the local importance of neighborhoods, etc.

Also, the small list 216 may include popular (e.g., frequently-searched) neighborhoods. The mobile computing device 102 may, in some embodiments, store a version of the small list 216 of neighborhoods, for example, as described herein below. The large list 218 may comprise additional neighborhoods (e.g., neighborhoods that do not comprise enough venues to be placed on the small list 216). The large list 218 may be used for various purposes, as described herein. For example, some venues may be located in a neighborhood that is included in the large list 218, but not included in the small list 216. When such venues are returned to the mobile computing device 102 as search results, the associated neighborhood from the large list 218 may be provided. Also, in some embodiments, a third list of neighborhoods may include still more neighborhoods such that all geography within a given area is a part of at least one neighborhood without regard to whether any venues are present. The third list may be used, in some cases, to correctly return the neighborhood of a known location in response to a free-form search.

Figure 3:
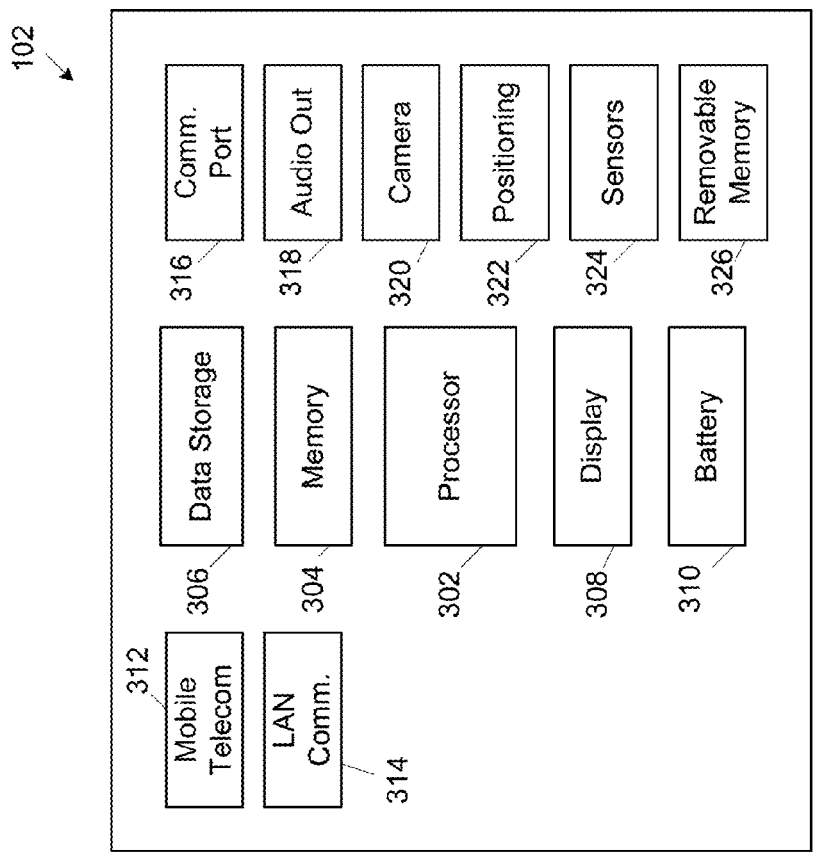
FIG. 3 is a diagram of one embodiment of a mobile computing device.

Before providing additional details of systems and methods for searching and displaying location-based venue information, a detailed description is provided of example hardware and software architectures for mobile computing devices 102 that may be utilized. The mobile computing devices 102 may include any type of mobile computer or computer device capable of executing an app. Examples of mobile computing devices may include Internet-enabled mobile telephones, smart phones (e.g., APPLE IPHONE, ANDROID-based smart phones, BLACKBERRY smart phones, etc.), tablet computers, laptop computers, etc. Mobile computing devices 102 typically provide a rich set of hardware and other features that may be utilized by apps, including the app 206 for providing venue information to users. For example, FIG. 3 is a diagram of one embodiment of a mobile computing device 102. The device 102 comprises a processor 302, memory 304, non-volatile data storage 306, and a display 308. The processor 302 may be any suitable type of microprocessor. In some embodiments, the processor 302 may comprise two separate processors, with one processor managing application and/or app execution and another managing communications.

The memory 304 may be random access memory and may comprise any suitable memory technology. Non-volatile data storage 306 may be any suitable type of physical disk, flash memory, etc. capable of storing data when the device 102 is powered down. In some embodiments, memory and nonvolatile storage may be implemented at a common component. The display 308 may be in communication with the processor 302 to allow the processor 302 to provide a user interface to a user of the device 102. The user interface may be utilized to provide the user with venue information, for example, as described herein. In some embodiments, the display 308 may be a tactile input or touch screen, allowing the user to provide input to the device 102 by contacting the display 308. Alternatively (or additionally) the mobile computing device 102 may comprise a track-ball (not shown) or other suitable pointing mechanism. In various embodiments, the device 102 may be powered by a battery 310, which may be any suitable type of battery including, for example, a lithium ion (Li-Ion) battery.

The device 102 may comprise a variety of additional hardware and/or software modules, described below, that may be made available to and/or utilized by apps, or may be a part of app-independent native functionality of the device 102. A mobile telecommunications interface module 312 may allow the device 102 to utilize one or more mobile communications networks (e.g., cellular networks) according to any suitable communications technology (e.g., 3G, 4G, etc.). For example, the device 102 may utilize a mobile communications network for voice and/or data communications. In some embodiments and in some circumstances, the mobile computing device 102 may be in communication with the application server system 104 via the mobile communications network (e.g., the network 105 may comprise the mobile communications network). The mobile telecommunications network may also provide the device 102 with location information, for example, derived from triangulation. That location information may be used, for example, to tailor venue searches, as described herein. A local area network (LAN) communications interface 314 may provide a communication link between the device 102 and a LAN. The communication link may be a wired or wireless link. For example, in some embodiments, the LAN communication interface 314 may be configured to facilitate communications according to the WI-FI standard. In some embodiments and in some circumstances, the LAN communications interface 314 may be utilized to communicate with the application server system 104 (e.g., the network 105 may comprise the LAN).

A communications port 316 facilitates direct, wired communications between the mobile computing device 102 and other devices (e.g., other mobile computing devices 102, desktop computers, etc.). The communications port 316 may be configured according to any suitable standard including, for example, Universal Serial Bus (USB), IEEE 1394 (FIREWIRE), etc. In addition, some mobile computing devices 102 may have an audio output module 318. The audio output module 318 may comprise hardware and/or software for providing electrical audio signals to a speaker and/or headphone set of the user. For example, the audio output module 318 may comprise an output jack for receiving an input connector of a speaker or headphone set. In some embodiments, the audio output module 318 may implement a digital to audio converter and/or one or more codecs for decoding audio according to various formats (.wav, .mp3, etc.). The codecs may be hardware and/or software implemented. A camera module 320 may comprise hardware and/or software for capturing images. For example, the camera module 320 may comprise a charge coupled device (CCD) or any other suitable sensor, focusing optics, as well as hardware and/or software for capturing images according to an image format (e.g., .jpg, .bmp, .tif, etc.). Captured images may be provided to the processor 302, which may store the images at memory 304 and/or data storage 306.

A positioning module 322 may comprise hardware and/or software for determining a geographic position of the device 102. For example, the positioning module 322 may comprise a satellite-based Global Positioning System (GPS) and/or any other any other type of positioning system (e.g., compass, network triangulation system, etc.). The geographic position or location of the device may be used for venue searches, for example, as described herein. A sensor module 324 may comprise one or more sensors that may be accessible to apps executed by the device 102. For example, the sensors may include one or more accelerometers, gyroscopes, magnetic sensors, etc. A removable memory module 326 may operate to receive one or more removable memory devices such as, for example, any form of SD card, USB flash memory, etc. It will be appreciated that different styles and/or models of mobile computing devices may have different hardware and/or software functionality. Accordingly, many mobile computing devices will include combinations of hardware/software modules different than that of the example device 102. For example, mobile computing devices may include additional hardware/software modules not shown in FIG. 3 and/or omit one or more of the hardware/software modules shown in FIG. 3.

Figure 4:
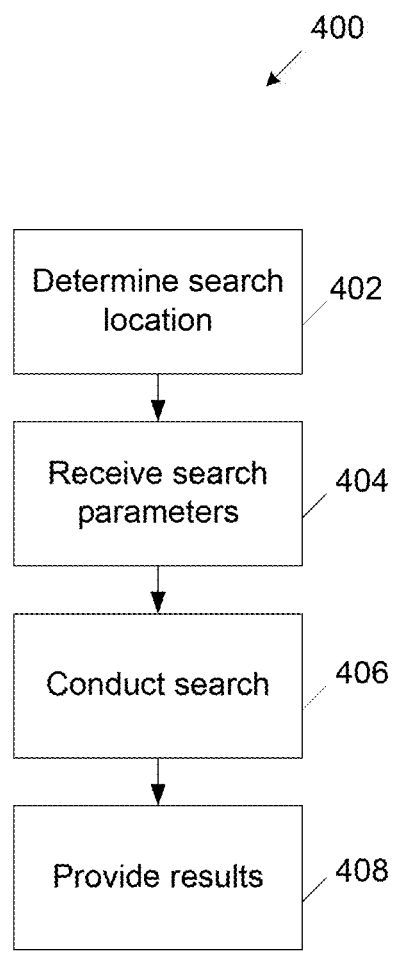
FIG. 4 is a flow chart showing one embodiment of a process flow for providing venue information to a mobile computing device based on a geographic area.

FIG. 4 is a flow chart showing one embodiment of a process flow 400 for providing venue information to a mobile computing device based on a neighborhood or search location utilizing the application server system 104 and a mobile computing device 102. For example, the process flow 400 may be representative of actions performed by the mobile computing device 102 upon execution of the app 206. At 402, the mobile computing device 102 may determine a search location. The search location may be determined automatically based on the location of the mobile computing device 102 or, in some embodiments, may be selected by the user. In some embodiments, the search location may be a neighborhood. For example, FIGS. 5-11 below describe example methods for selecting a neighborhood. In various embodiments, when a neighborhood is selected at 402, it may be selected from the small list 216 (e.g., because it will be used as a search parameter).

At 404, the mobile computing device 102 may receive (and/or generate) search parameters. The search parameters may describe a desired venue or venues to be returned in a search. Search parameters may be generated automatically (e.g., as described herein) and/or received from the user (e.g., via a touchscreen 308, trackball, keyboard or other input device of the mobile computing device 102). The search parameters may comprise a neighborhood and/or other search location determined at 402. At 406, a search for venues is conducted based on the search parameters. The search may be conducted by the mobile computing device 102 and/or the application server system 104. For example, in some embodiments, the mobile computing device 102 may comprise venue data stored at any suitable data storage location thereof. The mobile computing device 102 may, therefore, perform the search by applying the search parameters to the local venue data. Also, in some embodiments, all or a portion of the venue data 221 may be stored at the application server system 104 (as shown in FIG. 2). In this case, the mobile computing device 102 may provide the application server system 104 with a search query comprising the search parameters. The application server system 104 may search the business data 221 and provide results to the mobile device 102.

At 408, the mobile device 102 may provide results of the search to the user. The results may be presented in any suitable format including, for example, as a graphical user interface provided on a display 308 of the mobile computing device 102. In various embodiments, the results may be limited to venues within a neighborhood determined at 402. In other embodiments, the results may include venues outside of the neighborhood determined at 402 including, for example, venues within a threshold distance of the neighborhood or the search location (e.g., the threshold distance may be another search parameter), venues in adjacent and/or nearby neighborhoods, etc. Also, in some embodiments, the results, when displayed to the user, may be ordered based on the neighborhood of the displayed venues (e.g., venues in the geographic area may be listed first). In some embodiments, a distance between each venue and the neighborhood and/or search location may also be displayed.

Figure 5:
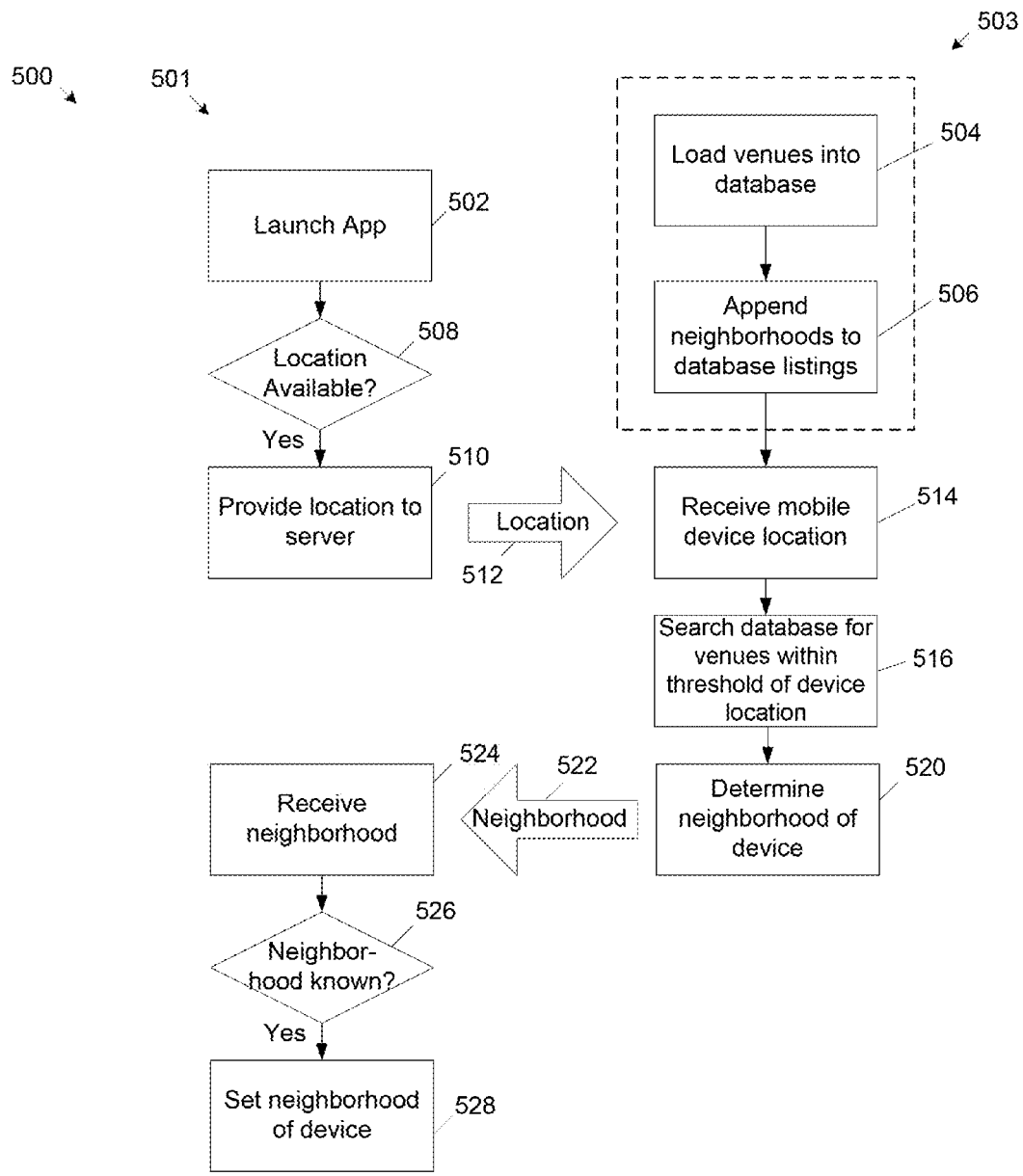
FIG. 5 is a flow chart showing one embodiment of a process flow for selecting a geographic area or neighborhood based on a location of the mobile computing device.

FIG. 5 is a flow chart showing one embodiment of a process flow 500 for selecting a neighborhood based on a location of the mobile computing device 102. The process flow 500 may describe one example way to determine a neighborhood, as described above with respect to action 402. The process flow 500 comprises actions that may be performed by any combination of the mobile computing device 102, for example, upon execution of the app 206, as well as actions that may be performed by the application server system 104, for example, on execution of the search module 212. An example division of the actions between the mobile computing device 102 and the application server system 104 are shown by columns 501 and 503. Actions that may be performed by the mobile computing device 102 are indicated in column 501 while actions performed by the application server system 104 are indicated in column 503.

Before taking part in the other actions of the process flow 500, the application server system 104 may optionally perform various preparatory actions 504, 506. For example, at 504, the application server system 104 may load available venues into a searchable database structure (e.g., the business data 221). The searchable database structure may be configured according to any suitable database structure including, for example, Open Database Connectivity (ODBC), Structured Query Language (SQL), etc. At 506, the application server system 104 may associate all or a portion of the venues in the database with a neighborhood or neighborhoods. The application server system 104 may determine the neighborhood to assign to particular venues based on any suitable method. For example, the application server system 104 may compare a location of each venue to the various neighborhood boundaries and/or constituent geographic units stored at 221. In various embodiments, neighborhoods assigned to venues may be selected from the large list 218. In some embodiments, the application server system 104 may request and/or receive venue data in a form such that each venue is already associated with a neighborhood.

To initiate neighborhood detection, the mobile computing device 102 may launch the app 206. Upon launch of the app 206 (or after launch of the app 206), the mobile computing device 102 may determine if a location of the mobile computing device 102 is available at 508. Determining if a location of the mobile computing device is available may comprise, for example, querying various functionality of the mobile computing device including, for example, a positioning module 322 of the device, as illustrated in FIG. 3 and described in more detail below with respect to FIG. 9. If a location of the mobile computing device is available at 508, the mobile computing device 102 may provide the location 512 to the application server system 104 at 510. The location may be a current or real-time location of the mobile computing device 102 or a previous location, as described in more detail below with respect to FIG. 9.

The application server system 104 may receive the location 512 at 514. At 516, the application server system 104 may search the venue data 221 for venues within a threshold distance of the location 512. The threshold distance may be of any suitable value and, in some embodiments, may be one mile. In various embodiments, the search at 514 may be based on a popular category or categories of venues. For example, a popular category or categories of venues may be used as a parameter or parameters for the search. Popular categories may be categories of venues for which there are a large number of venues within the threshold distance (e.g., a threshold number of venues). For example, if there are a large number of venues in the neighborhood of the device in a given category (e.g., shoe stores), then that category may be used as at least one of the popular categories. Popular categories may be determined by the application server system 104 for each received location 512 or, in some embodiments, may be pre-calculated by the application server system 104 and/or received as a pre-defined list. In some embodiments, popular categories may be based on prior searches by the user and/or other users (e.g., prior searches related to a common or close neighborhood). In various embodiments, multiple searches may be performed, with each search returning venues in one or more of the popular categories that are within the threshold distance of the location 512.

Based on the venues returned by the search, the application server system 104 may determine a neighborhood location of the mobile computing device 104, at 520. For example, the application server system 104 may select a first venue from the search results based on a distance between the location 512 and a location of the first venue. In some embodiments, the first venue may be the venue from the search results that is closest to the location 512. The neighborhood associated with the first venue may be returned as the neighborhood of the mobile computing device 506. In some embodiments, the application server system 104 may select a neighborhood for the mobile computing device 102 based on an amalgam of the neighborhoods of the venues returned by the search at 516. For example, the application server system 104 may select the neighborhood returned by a majority and/or plurality of the returned results, etc. Also, in some embodiments, the application server system 104 may select a neighborhood for the mobile computing device over all of the one or more popular venue categories. For example, a venue closest to the location of the mobile computing device 104 may be selected from each of the one or more categories. The neighborhood of the mobile computing device 104 may be selected from these results in any suitable manner (e.g., majority or plurality of neighborhoods of resulting venues, amalgam of neighborhoods from resulting venues, etc.).

The determined neighborhood 522 of the mobile computing device 102 may be transmitted to the mobile computing device 102, where it may be received at 524. At 526, the mobile computing device 102 may determine whether the returned neighborhood 522 is on the small list 216. If the neighborhood 522 is on the small list 216, then the mobile computing device 102 may set its neighborhood equal to the returned neighborhood 522 at 528. If the neighborhood 522 is not on the small list, then the mobile computing device 102 may request that the application server system 104 provide an additional neighborhood (e.g., based on other results of the search from 516).

In other embodiments, instead of transmitting a single neighborhood 522, the application server system 104 may return to the mobile computing device 102 the venues returned by the search at 516 including, for example, the neighborhoods associated with each venue. The mobile computing device 102 may then select the first venue from the search results based on the distance between the first venue and the location 512 of the mobile computing device 102, as described above, and determine whether the associated neighborhood is on the small list 216, as described at 526. If the neighborhood is not on the small list 216, the mobile computing device 102 may select another venue from the search results (e.g., the next closest venue to the location 512). Also, in some cases, instead of transmitting the single neighborhood 522, the application server system 104 may transmit a list of neighborhoods associated with the venues returned by the search at 516. The mobile computing device 102 may then select an appropriate neighborhood from the list.

Figure 6:
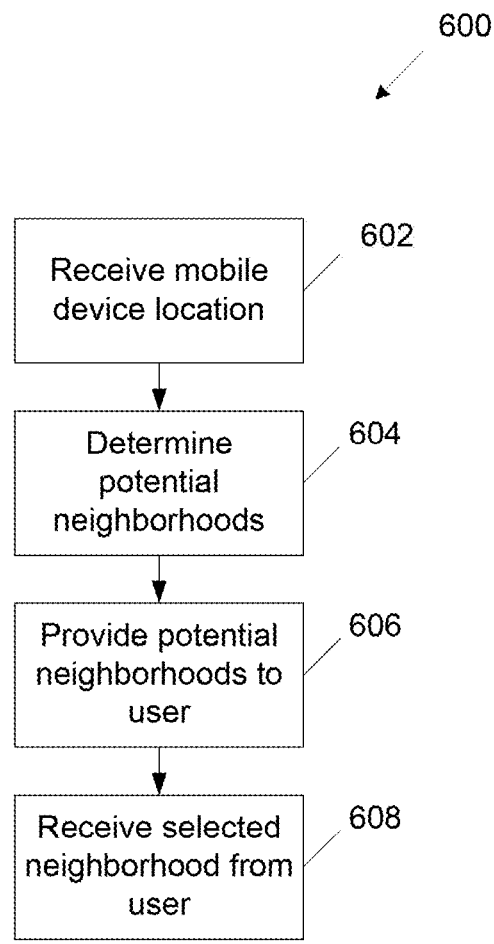
FIG. 6 is a flow chart showing one embodiment of a process flow for selecting a geographic area or neighborhood based on a location and on user input.

FIG. 6 is a flow chart showing one embodiment of a process flow 600 for selecting a neighborhood based on a location and on user input. The process flow 600 may be executed by any combination of the mobile computing device 102 and application server system 104, for example, during execution of the app 206. At 602, the mobile computing device may receive a location. The location may be received directly from a user. For example, the mobile computing device 102 may prompt the user to provide a location. The location received from the user may be, for example, a point location (e.g., a latitude and longitude, a street address, etc.) or a region (e.g., a city, municipality etc.). Also, in some embodiments, the received location may be a location of the mobile computing device 102 itself, as determined, for example, by a positioning module 322 of the device, as illustrated in FIG. 3 and described in more detail below with respect to FIG. 9. Any location may be used including, for example, a real-time location or a previous location.

At 604, the mobile computing device 102 may determine a list of selectable neighborhoods based on the received location. For example, the mobile computing device 102 may include on the list neighborhoods within a threshold distance of the location. When the location is a region, the selectable neighborhoods may include neighborhoods within the region. At 606, the mobile computing device 102 may provide the list of selectable neighborhoods to a user, for example, via a user interface. At 608, the mobile computing device 102 may receive from the user a selected neighborhood which may be used, for example, as the neighborhood described above with respect to 402.

Figure 7:
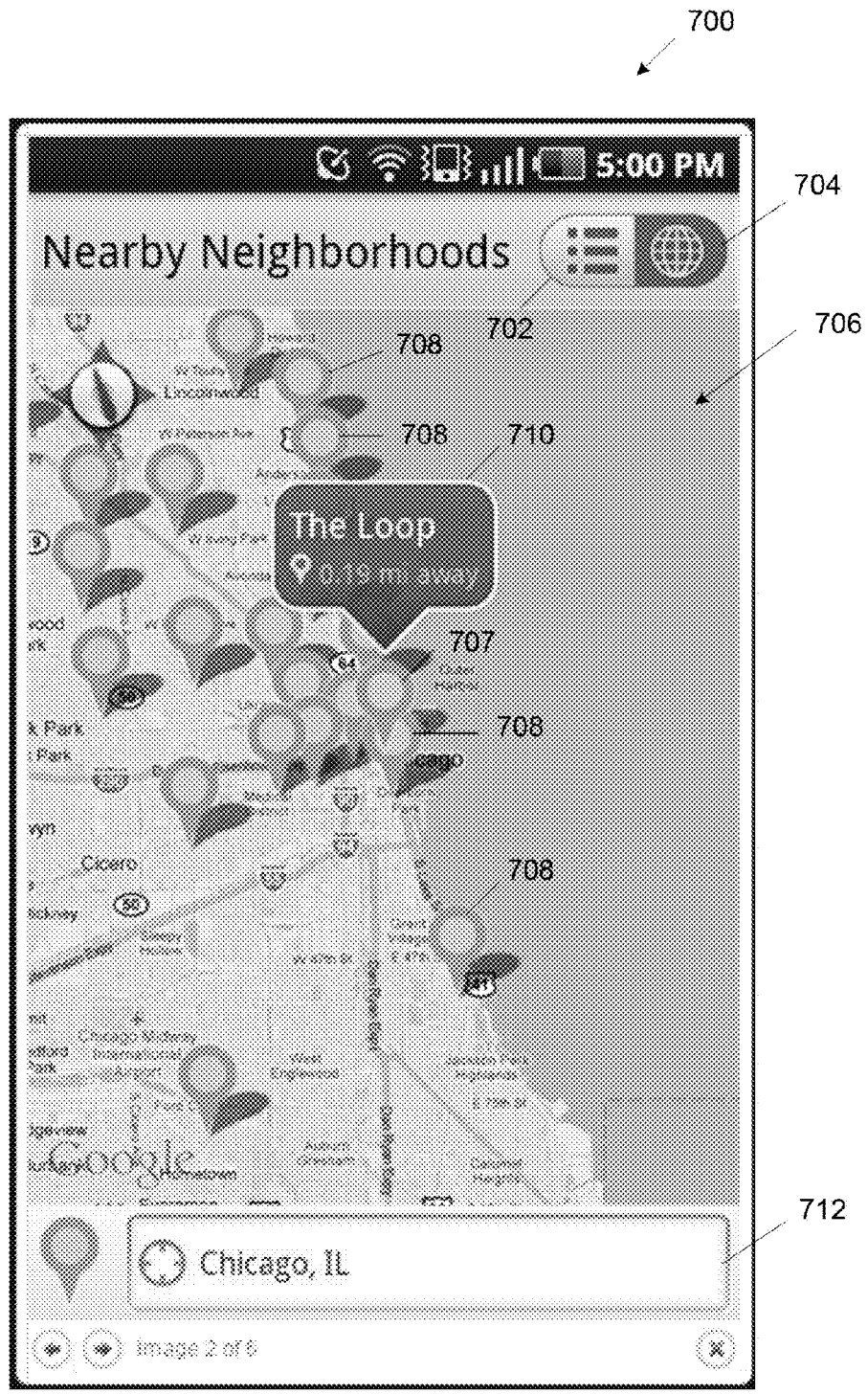
FIG. 7 is a screen shot showing one embodiment of a user interface for providing potential geographic areas to the user and receiving one or more selected geographic areas from a user.
Figure 8:
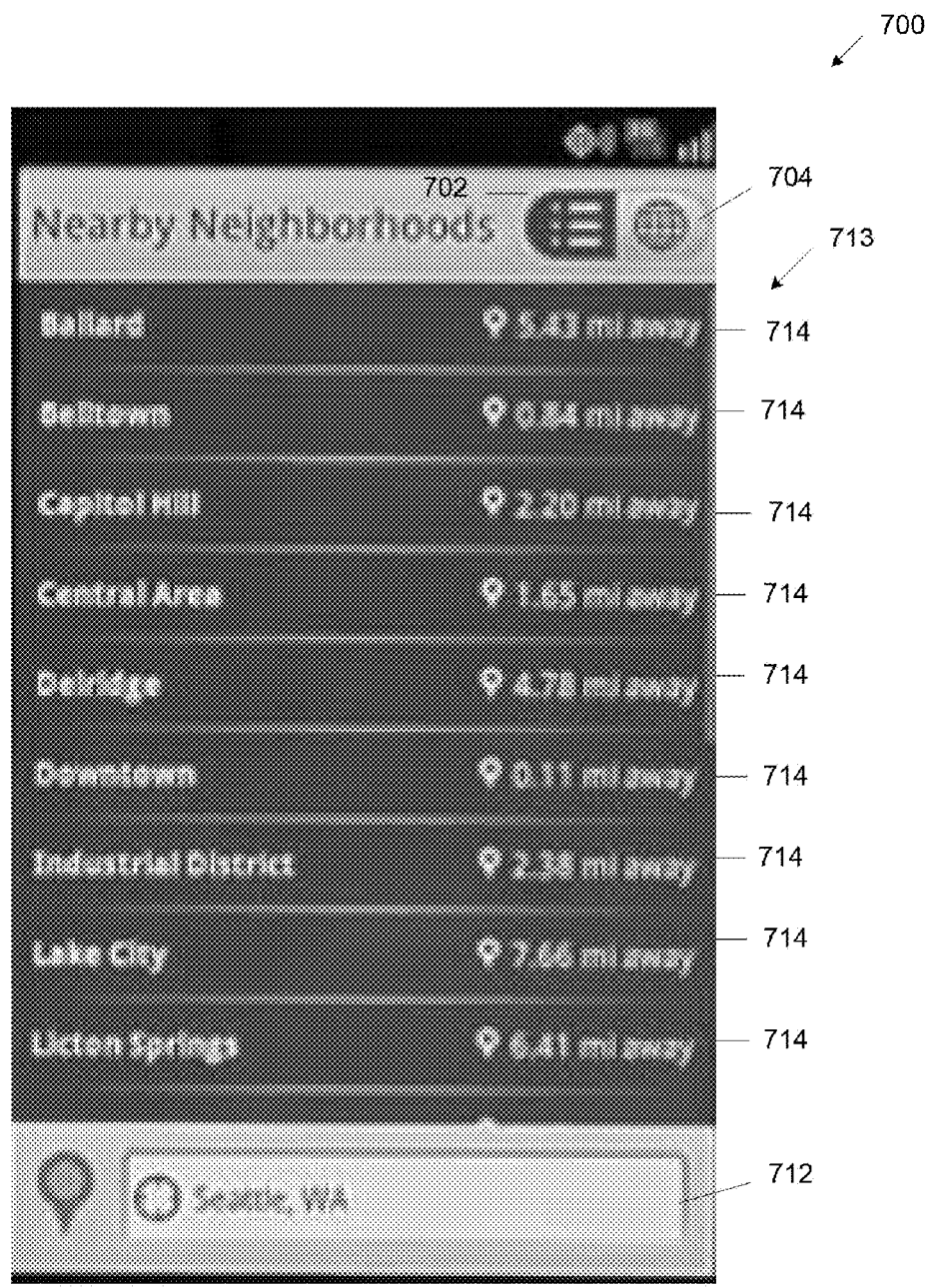
FIG. 8 is a screen shot showing one embodiment of the user interface with the list button selected.

FIG. 7 is a screen shot showing one embodiment of a user interface 700 for providing selectable neighborhoods to the user and receiving one or more selected neighborhoods from a user (e.g., as described above with respect to 606 and 608). The interface 700 may be provided to the user on a display 308 of the mobile computing device 102. A location field 712 may display the location (e.g., the location received at 602). In some embodiments, the user may enter a location at the field 712. A map button 704, when selected by the user, may cause the interface 700 to display the selectable neighborhoods in map form. A list button 702, when selected by the user, may cause the interface 700 to display the selectable neighborhoods in list form (e.g., as illustrated in FIG. 8 and described below). A map button 704, when selected by the user, may cause the interface 700 to display the selectable neighborhoods in a map form. When the map button 704 is selected, as shown in FIG. 7, a map 706 including selectable neighborhoods is shown. Selectable neighborhoods are indicated in the map by icons, including icons 707, 708. To select a neighborhood, the user may select an icon, such as one of the icons 707, 708. The icon may be selected according to any suitable manner. For example, when the display 308 is a touch screen, the user may touch a desired icon with a finger. Various other pointing devices may be used. In some embodiments, the user may select an icon, such as 707, 708 to receive additional information about a neighborhood before selecting the neighborhood. For example, in FIG. 7, the user has selected icon 707, causing information window 710 to display additional information about the corresponding neighborhood including, for example, the name of the neighborhood and a distance of the neighborhood from the location.

FIG. 8 is a screen shot showing one embodiment of the user interface 700 with the list button 702 selected. List 713 comprises entries 714. Each entry 714 may correspond to a potential neighborhood. In some embodiments, each entry 714 may provide information about its associated neighborhood including, for example, a name of the neighborhood, and a distance of the neighborhood from the location. The user may select a potential neighborhood from the list 713 by selecting one of the entries 714 in any suitable manner.

Figure 9:
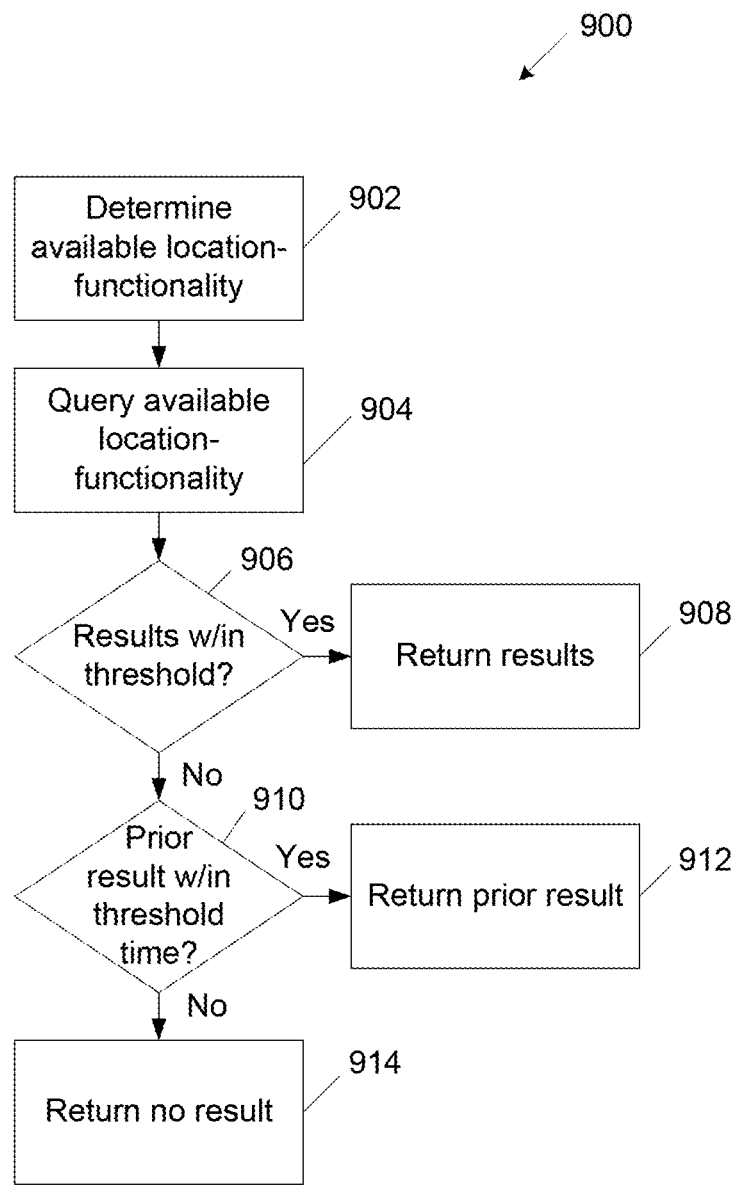
FIG. 9 is a flow chart showing one embodiment of a process flow for finding a location of the mobile computing device.

FIG. 9 is a flow chart showing one embodiment of a process flow 900 for finding a location of the mobile computing device 102. The process flow 900 may be executed by the mobile computing device 102 as a part of the execution of the app 206, for example, when finding the location of the mobile computing device 102 and/or determining whether such a location is available. For example, the process flow 900 describes one example way that the mobile computing device 102 may execute actions 602 and 508 described above. At 902, the mobile computing device 102 may determine its available location systems. Such systems may include, for example, a positioning module similar to the module 322 described above. Location systems may also include other systems or modules of the mobile computing device 102, including systems and modules whose primary functionality is not location-related. For example, the LAN communications module 314 and/or mobile telecommunication module 312, in some embodiments, may be capable of providing an approximate location of the mobile computing device 102 (e.g., via signal triangulation). Such modules, when capable of providing location information, may also be considered to be location systems. For example, any type of wireless communication could potentially utilize triangulation to derive a location of the mobile computing device. At 904, the mobile computing device 102 may query available location systems. If more than one location system is available (e.g., GPS and mobile telecommunication-based triangulation), the mobile computing device 102 may select which system to query, such as the system that typically provides the most accurate results. Also, in some embodiments, the mobile computing device 102 may query all available location systems and analyze all of the resulting approximate locations.

At 906, the mobile computing device 102 may determine if any location results received from the location system or systems are within a threshold accuracy level. The threshold accuracy level may represent an accuracy level that allows the mobile computing device 102 to perform and/or facilitate location-based venue searches with a reasonable degree of accuracy. For example, the threshold accuracy level may be 60 meters or some other selected distance. If at least one location result is within the threshold accuracy, this result may be set as the location of the mobile computing device 102 location at 908. If more than one result meets the threshold accuracy, the most accurate may be set as the location of the mobile computing device 102 at 908. The location returned at 908 may be considered a current or real-time location of the mobile computing device 102.

If no results meet the threshold accuracy, then the mobile computing device 102 may determine at 910 whether there is a prior (e.g., historical) mobile computing device location result within a predetermined time threshold. For example, if a valid location result has been returned within the predetermined time threshold (e.g., one hour); the prior result (e.g., a historical location) may be returned as the mobile device location at 912. For example, it may be assumed that the mobile computing device 102 is either still sufficiently close to the prior location or that venue searches based on the prior location will provide results meaningful to the user (e.g., results including venues close to the user's current location). In some embodiments, the user may be notified (e.g., via the display 308) that the mobile computing device location being used is a historical location and not a current or real-time location. If at 910, there is no prior mobile device location result, no result may be returned at 914. For example, the mobile computing device may determine that no location is available.

Figure 10:
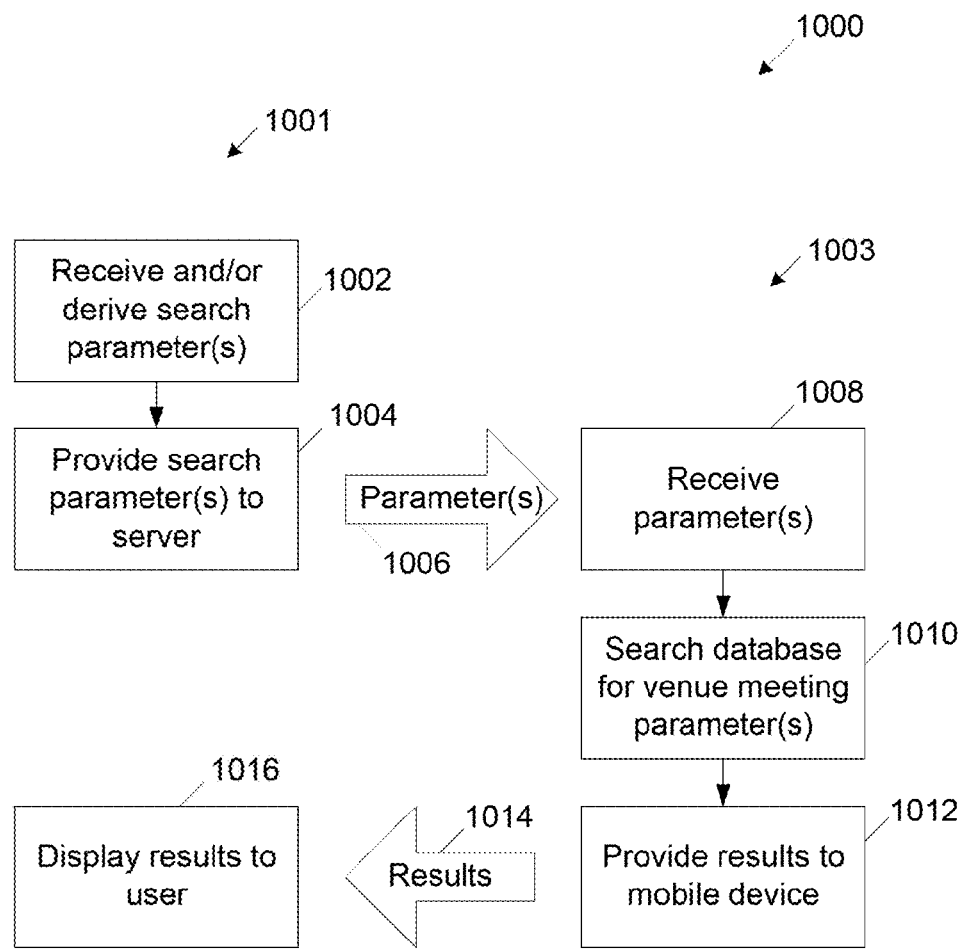
FIG. 10 is a flow chart showing one embodiment of a process flow for performing a venue search utilizing the mobile computing device.

FIG. 10 is a flow chart showing one embodiment of a process flow 1000 for performing a venue search utilizing the mobile computing device 102. For example, the process flow 1000 may be similar to the process flow 400 described herein above. The process flow 1000 may, however, include actions performed by the mobile computing device 102 (e.g., under the direction of the app 206) and the application server system 104 (e.g., under the direction of the search module 212). For example, FIG. 10 includes a column 1001 indicating actions that may be taken by the mobile computing device 102 and a column 1003 indicating actions that may be taken by the application server system 104.

At 1002, the mobile computing device 1002 may receive and/or derive at least one search parameter. For example, the search parameters may include the neighborhood selected, for example, as described above with respect to process flows 500 and 600. Additional search parameters may be received from the user. Examples of user-provided search parameters may include, for example, the type of business or venue to location, a capability of the business or other venue (e.g., a restaurant that takes Internet reservations), etc. Also, in some embodiments, search parameters may be derived by the mobile computing device 102, as described herein. At 1004, the mobile computing device 102 may provide the at least one search parameter 1006 to the application server system 104, which may receive the same at 1008. At 1010, the application server system 104 may search the business data 221 based on the at least one parameter. Results 1014 of the search may be provided to the mobile computing device 102 at 1012. The results may be a listing of venues meeting the search parameters. Results may be presented to the user in any suitable manner including, for example, as a list, as a map, etc. An example interface for providing search results is described below with respect to FIGS. 12-17. In some embodiments, the application server system 104 may provide additional information about the search results including, for example, address information, reviews, distance information, etc. At 1016, the mobile computing device 102 may display the results (and any additional information) to the user, for example as part of a user interface.

Figure 11:
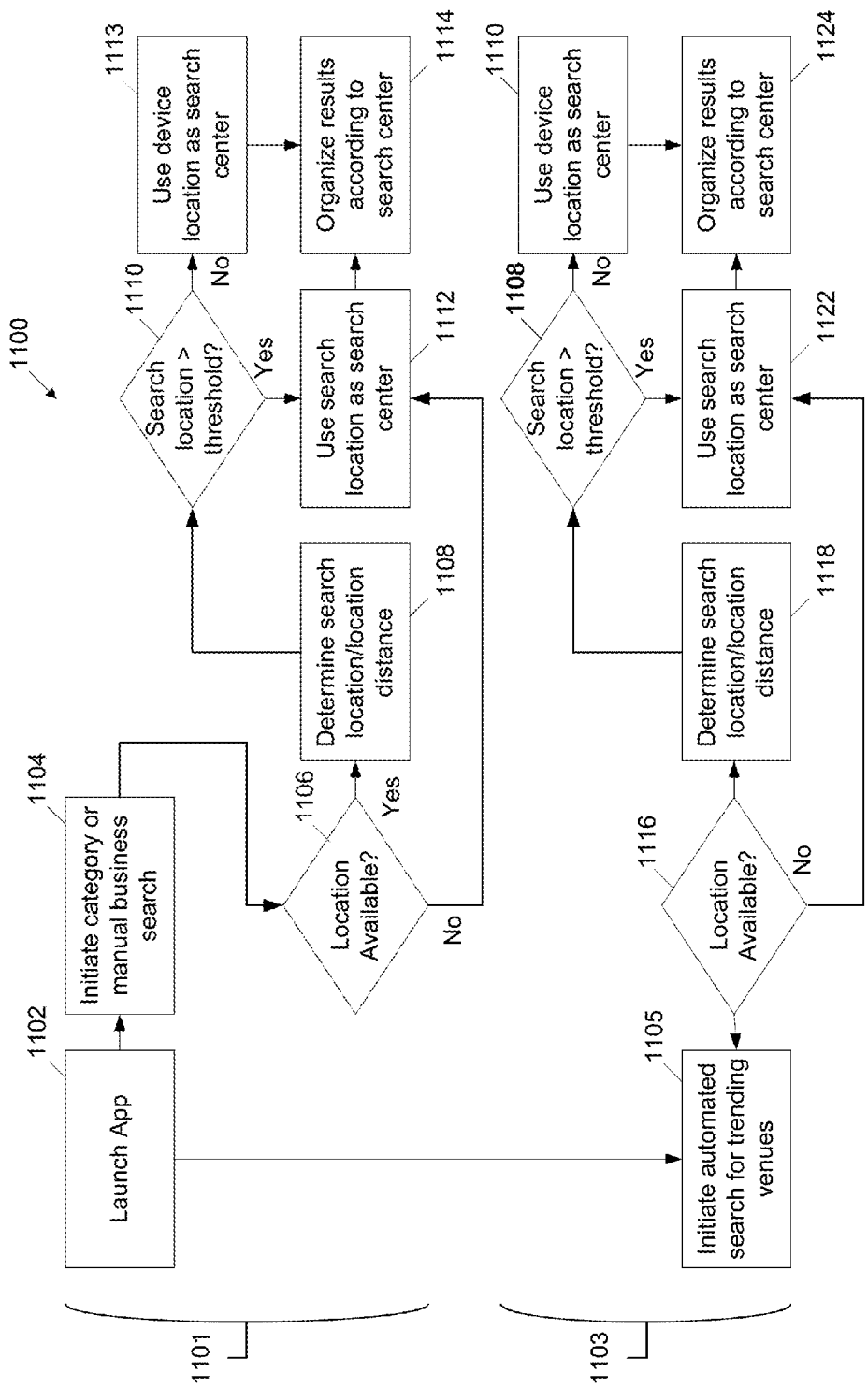
FIG. 11 is a flow chart showing one embodiment of a process flow for selecting a center location for a venue search using the mobile computing device and the application server system of FIG. 1.

FIG. 11 is a flow chart showing one embodiment of a process flow 1100 for selecting a geographic search center for a venue search using the mobile computing device 102 and the application server system 104. The geographic search center may be a location about which search results are centered and/or organized for display to the user. The process flow 1100 comprises two sub-process flows 1101, 1103. The sub-process flows 1101, 1103 may be performed together (simultaneously or otherwise). Also, in some embodiments, the sub-process flows 1101, 1103 may be performed separately and/or independently. At 1102, the mobile computing device 102 may launch the app 206. Action 1102 may be common to both sub-process flows 1101, 1103.

Focusing now on sub-process flow 1101, the mobile computing device 102 may initiate a search at 1104. The search may be an automatic category search (e.g., as described above with respect to 516) or a user-initiated search based on parameters received from the user. For example, a user-initiated search may be instituted when the mobile computing device 102 sends a search query to the application server system 104. In various embodiments, the search at 1104 may be a location-based search or query having a search location. The search location may be a parameter of the search, for example, received from the user. For example, the user may specify as a search location a particular latitude and longitude, a particular address, etc. If the user does not specify a search location, the mobile computing device 102 and/or application server system 102 may set a default search location such as, for example, a previously measured location of the mobile computing device 102, a previously determined neighborhood of the mobile computing device 102 (e.g., determined according to the process flow 500 or the process flow 600), a prior search location, etc. At 1106, the mobile computing device 102 may determine whether its current location is available (e.g., as described above with respect to the process flow 900). In some embodiments, the device's location may not be considered available unless a current or real-time location is available.

If the current location is not available, then the geographic search center may be set equal to the search location at 1112 (e.g., by the mobile computing device 102 and/or by the application server system 104). If the search location is a neighborhood then, in some embodiments, the geographic search center may be set equal to a geographic center of the neighborhood. If the current location is available, then current location may be transmitted to the application server system 104. At 1108, it may be determined whether the search location is within a threshold distance (e.g., 20 miles) of the current location of the mobile computing device 102. The determination at 1108 may be made, for example, by either the application server system 1104 or the mobile computing device 102. Provided that the search location is within the threshold distance of the current location at 1110, then the current location may be set as the geographic search center at 1113. If the search location is not within the threshold distance of the current location at 1110, then the search location may be set as the geographic search center at 1112. In embodiments where the mobile computing device 102 determines whether the search location is within the threshold distance of the current location, the mobile computing device 102 may also set the geographic search center and may provide the geographic search center to the application server system 104.

In some embodiments, the application server system 104 may return its search results with an indication, for each venue, of a distance between the venue and the geographic search center. At 1114, results of the search may be presented to the user on the mobile computing device 102 organized according to the geographic search center. For example, venues may be listed in order of their distance from the geographic search center and/or displayed on a map around the geographic search center. The results may be organized based on the geographic search center at the application server system 104 before download to the mobile computing device 102. In some embodiments, however, the mobile computing device 102 may perform the organizing after receipt of the search results. In various embodiments, the geographic search center may be used in subsequent searches as a search query parameter.

Referring now to sub-process flow 1103, the mobile computing device 102 may initiate an automated search for trending venues at 1105. The search may be initiated automatically upon launch of the app 206. Trending venues, as described above, may be selected based on the activities of venue patrons. For example, trending venues may be selected based on the relative and/or absolute number of patrons present at the venues, a relative and/or absolute number of reviews or other feedback received about the venues, etc. Accordingly, patron activity may constitute a parameter or parameters for the trending search. Additional parameters for the search may be determined in any suitable manner. For example, in some embodiments, parameters may include a popular category or categories, as described above with respect to the search at 516 above. Also, in some embodiments, the additional parameters may comprise a search location from a prior user-initiated and/or automatic search. In some embodiments, if there are no prior searches (e.g., since launch of the app 206), then trending venues are determined based on factors other than prior search locations, as described herein.

In various embodiments, the application server system 104 may receive patron-related information associated with different venues, also referred to as venue trending information, from a third party source including, for example, a social networking site such as FOURSQUARE, FACEBOOK PLACES, GOOGLE LATITUDE, etc. In some embodiments, the venue trending information may be stored in a dedicated database (e.g., at the application server system 104). Also, in some embodiments, patron reviews may be found on other Internet-accessible sources such as, for example, periodicals, newspapers, etc. The patron-related information may be utilized by the application server system 102 to return result venues for trending searches. Also, in some embodiments, trending venues may be received directly from a third party source, such as a social networking site, for example, in response to a search request directed to the third party source by the application server system 104. For example, the search request to the third party source may comprise the additional search parameters received from the mobile computing device 102 as described above.

At 1116, the mobile computing device 102 may determine whether its location is available, for example, as described above with respect to process flow 500. Again, in some embodiments, the location of the mobile computing device 102 may not be considered available unless a current location is available. If no current location is available at 1116, then the geographic search center for the trending search may be set to the search location. It will be appreciated that, in some embodiments, there may not be a search location (e.g., if there are no prior user searches). In those cases, the sub-process flow 1103 may terminate without providing trending venues if the current location of the mobile computing device 102 is not available.

If the current location of the mobile computing device 102 is available, then at 1118, the mobile computing device 102 and/or the application server system 104 may determine whether the mobile computing device location is within a threshold distance of the search location. If the mobile computing device location is not within the threshold distance of the search location at 1120, then the geographic search center for the trending search may be set to the search location at 1122. If the mobile computing device location is within the threshold distance of the search location at 1120, then the geographic search center for the trending search may be set to the mobile computing device location at 1123. At 1124, results of the trending search may be organized according to the geographic search center, for example, as set forth above with respect to 1114. In some embodiments, the results of the trending search provided to the mobile computing device 102 may also indicate, for each returned venue, a distance between the returned venue and the geographic search center. Also, in some embodiments, the geographic search center may be used as a parameter for subsequent trending searches. It will be appreciated that, in some embodiments, trending searches may be performed without determining a geographic search center. For example, trending searches may be performed simply based on a search location and/or mobile computing device location.

Figure 12:
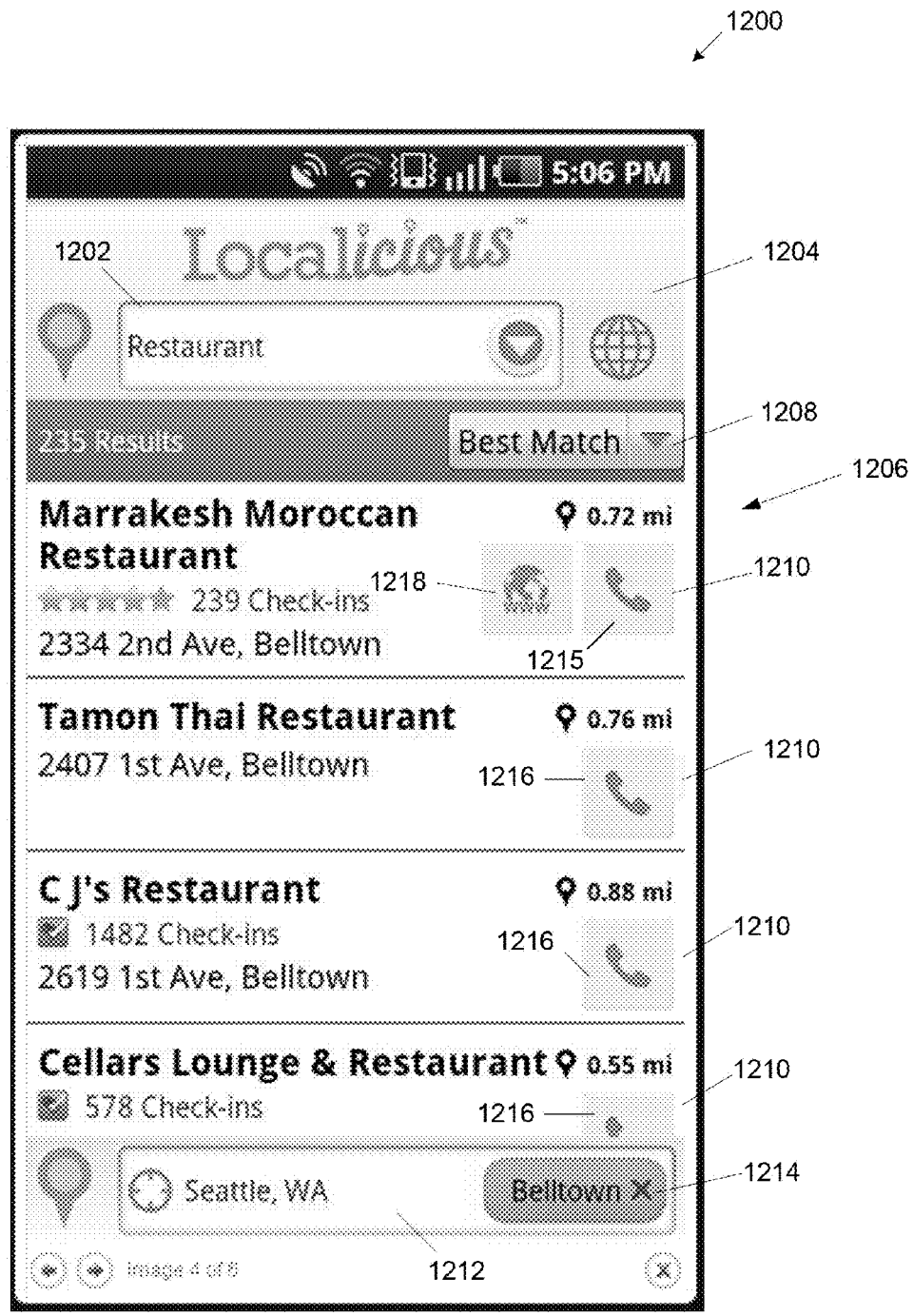
FIG. 12 is a screen shot showing one embodiment of a user interface for facilitating venue searches by a user of the mobile computing device.

FIG. 12 is a screen shot showing one embodiment of a user interface 1200 for facilitating venue searches by a user of the mobile computing device 102. For example, the user interface 1200 may be used to present results of venue searches according to any of the process flows described herein including, for example, 400, 1000 and 1100. The interface 1200 may comprise a search parameter field 1202. The search parameter field 1202 may receive search parameters from the user, for example, as described above with respect to process flows 400 and 600. The search parameters received may be of any suitable form. For example, search parameters may describe categories of venues (e.g., restaurant). Also, in some embodiments, search parameters received from the user may include key words or any other suitable parameter that could differentiate one venue from another including, for example, ratings, prices, etc. Location field 1212 may receive a search location for the search. The search location may indicate a location from which returned venues will be selected. The search location may be a neighborhood, or any other suitable geographic indicator including, for example, a city, state, metropolitan area, latitude and longitude, other GPS coordinates, etc. In FIG. 12, the search location is Seattle, Wash. As described above, the search location may be a search parameter. In some embodiments, the search location may be used to select selectable neighborhoods for the mobile computing device 102, which may, in turn, be used as a search parameter or parameters. Neighborhood button 1214 may indicate the currently selected neighborhood. Selecting the neighborhood button 1214 may cause the mobile computing device 202 to re-generate a neighborhood for the mobile computing device 102, for example, according to one of the process flows 500, 600 described herein above.

Results field 1206 may list venues returned from a search (e.g., search 408, search 1016, etc.). The results field 1206 may comprise a plurality of entries 1210, with each entry 1210 corresponding to a single returned venue. The entries 1210 may be organized in the results field 1206 in any suitable way. For example, a sort button 1208 may provide a drop-down menu or other suitable way for the user to indicate a preferred sorting criteria for the entries 1210. In the example of FIG. 12, the sort button 1208 is set to show entries 1210 in order of the best match between the returned venues associated with each entry 1210 and the search parameters. Other potential sorting methodologies include, for example, a sort by distance from a fixed location (e.g., the mobile computing device location, the geographic search center, etc.); a sort by neighborhood, a sort by venue type, etc. Each entry 1210 may indicate a name of the associated venue as well as various other information and functionality about the venue. Example information about a returned venue that may be included in its associated entry 1210 may include, for example, an address, a telephone number, whether the venue supports a check-in service, a number of patrons currently and/or recently checked-in at the venue, a distance between the venue and a location of the mobile computing device or search center, etc. Example functionality regarding a returned venue that may be included in its associated entry 1210 may include, for example, a telephone button 1216 and a website button 1218. Selecting the telephone button 1216 causes the mobile computing device 102 to place a telephone call to the venue (e.g., utilizing a mobile telecommunications module such as 312 described above). Selecting the website button 1216 may cause the mobile computing device to access a website of the venue. For example, the mobile computing device 102 may execute a browser and receive website information via any suitable communication technology such as, for example, a LAN communication module similar to 314, a mobile telecommunications module similar to 312, etc.

Figure 13:
FIG. 13 is a screen shot showing another embodiment of the user interface of FIG. 12.
Figure 14:
FIG. 14 is a screen shot of another embodiment of the user interface of FIG. 12 showing a filter menu.

FIG. 13 is a screen shot showing another embodiment of the user interface 1200. In FIG. 13, the results field 1206 comprises entries organized by distance from a fixed location (e.g., the mobile computing device location, the geographic search center, etc.). FIG. 13 also illustrates a filter feature (e.g., of the mobile computing device 102 and/or the app 206). For example, a filter button 1220, when selected, may cause the mobile computing device 102 to display a drop-down menu displaying different venue filters that may be selected by the user. In various embodiments, the venue filters may denote categories of venues. Search results may be filtered by the mobile computing device 102 and/or by the application server system 104 such that the results shown at results field 1206 only show those results meeting the selected filter. In FIG. 13, filter field 1220 identifies a "bar" filter that returns only venues that have bars. Obviously, other filter types may be used in other embodiments. FIG. 14 is a screen shot of another embodiment of the user interface 1200 showing a filter menu 1230. The filter menu 1230 may be displayed, for example, when the filter button 1220 is selected. The filter menu 1230 may comprise a plurality of filter fields 1232 that may be selected by the user (e.g., from the filter menu 1230). In various embodiments, the mobile computing device 102 may receive unfiltered results from the application server system 104 and apply a filter to those results upon receipt. Also, in some embodiments, the filter described herein may be provided to the application server system 104 as an additional search parameter. FIG. 13 also shows a trending search window 1226. The trending search window 1226 may display results of trending searches, for example, as described above with respect to process flow 1100. For example, the trending search window 1226 may display one or more venue returned as a result of a trending search and, in some embodiments, an indication of the patron activity that caused the venue to be returned by the trending search. For example, in FIG. 13, the trending search window 1226 shows an example trending venue along with a review of the venue provided by a patron (e.g., the patron activity that caused the venue to be a trending venue).

Figure 15:
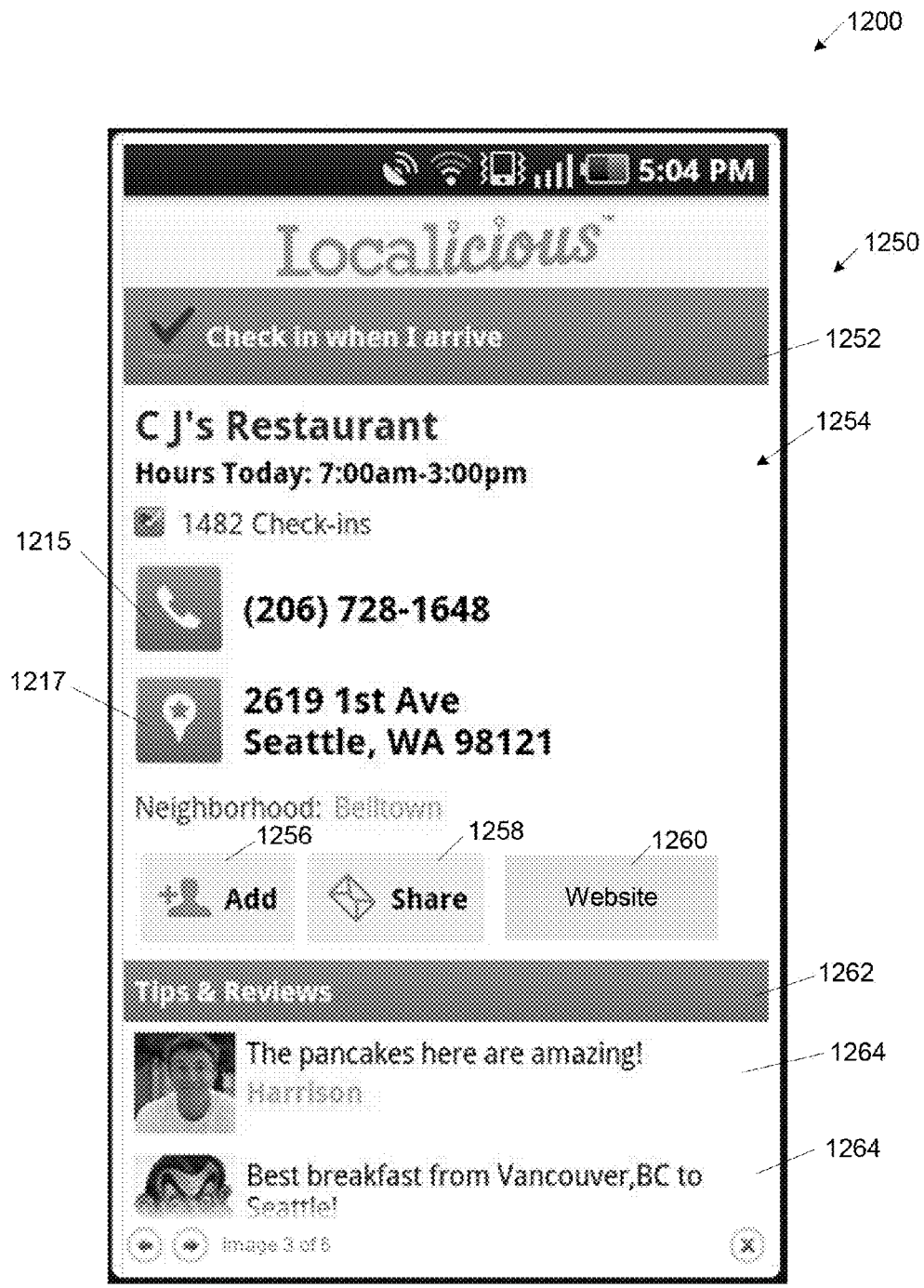
FIG. 15 is a screen shot showing another embodiment of the user interface of FIG. 12 including a business screen.

According to various embodiments, the user may select an entry 1210 to receive additional information about its associated venue. For example, FIG. 15 is a screen shot showing another embodiment of the user interface 1200 including a venue screen 1250. The venue screen 1250 may be displayed when the user selects one of the entries 1210 in the results field 1208. For example, the venue screen 1250 may comprise a venue information field 1254 including available information about the venue. The available information may comprise, for example, a name of the venue, an address of the venue, a phone number of the venue, a neighborhood in which the venue is located, etc. In some embodiments, the venue information field 1254 may also comprise a number of check-ins at the venue (e.g., according to a check-in service). Also, in some embodiments, certain functionality related to the venue may also be accessed via the venue information field 1254. For example, a telephone button 1216 may allow the user to use the mobile computing device 102 to initiate a telephone call to the venue, as described above. A map button 1217, when selected, may cause the user interface to display a map field indicating the location of the venue.

Figure 16:
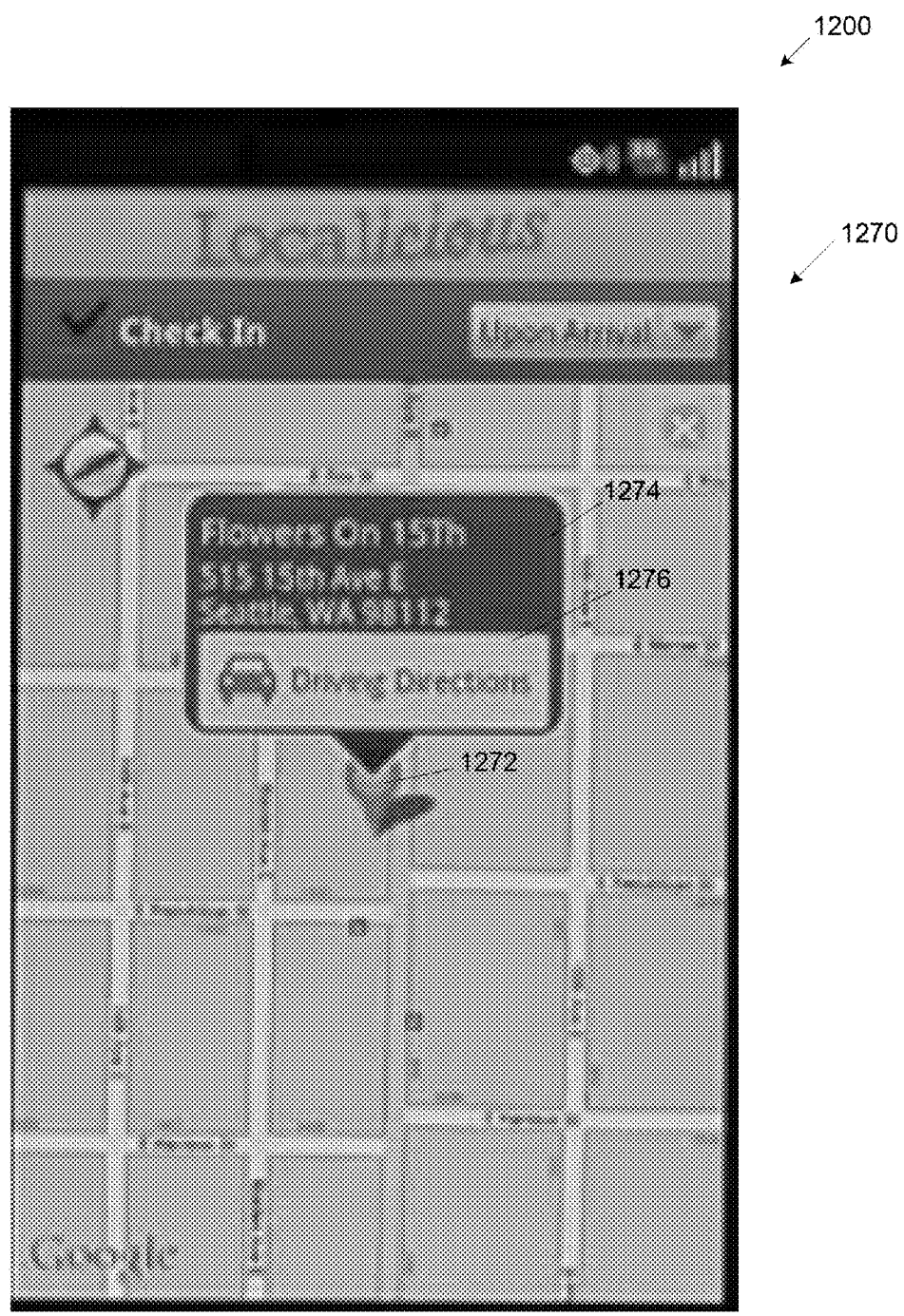
FIG. 16 is a screen shot showing another embodiment of the user interface of FIG. 12 comprising an example map field.

FIG. 16 is a screen shot showing another embodiment of the user interface 1200 comprising an example map field 1270. An icon 1272 may indicate the location of the venue on the map. A map information field 1274 may provide additional information about the venue location including, for example, an address. A driving directions button 1276 may, when selected by the user, cause the mobile computing device 102 to provide driving directions between a fixed location and the location of the venue. It may also provide, when selected, an option to get directions via other transportation modes such as, for example, walking and/or public transportation. The fixed location may be, for example, the location of the mobile computing device 102 (e.g., as determined according to the process flow 900).

Referring back to FIG. 15, the venue information field 1254 may also comprise an add button 1256. The add button 1256, when selected by the user, may cause the mobile computing device 102 to add the venue to a group of venues and/or individuals. A share button 1258, when selected by the user, may cause the mobile computing device 102 to share the venue and/or information describing the venue with another user. For example, the venue and/or information about the venue may be published to a social networking site associated with the user. A website button 1260 may cause the mobile computing device 102 to access a website associated with the venue. For example, the mobile computing device 102 may execute a browser and receive website information via any suitable communication technology such as, for example, a LAN communication module similar to 314, a mobile telecommunications module similar to 312, etc. In various embodiments, the venue screen 1250 may also comprise a tips and reviews field 1262. The tips and reviews field 1262 may comprise one or more review fields 1264 comprising reviews of the venue. The reviews may be composed by patrons of the venue including, for example, other users, journalists, etc.

Figure 17:
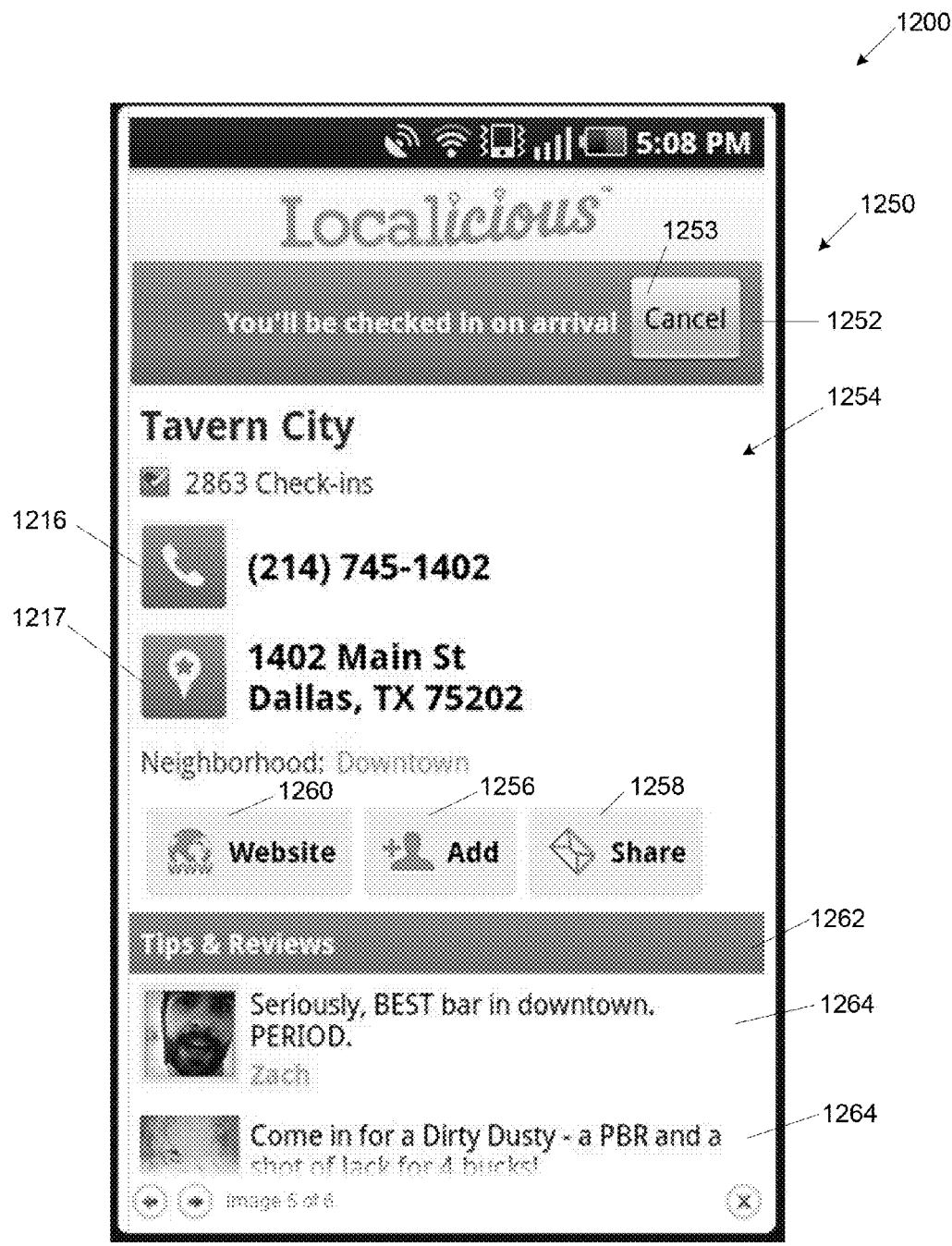
FIG. 17 is a screen shot showing another embodiment of the user interface of FIG. 12 with an automatic check-in feature enabled.

In various embodiments, the venue screen 1250 may also include functionality for activating an automatic check-in feature. The automatic check-in feature may allow the user to automatically check-in to a selected venue upon arrival to the venue. The check-in may be implemented according to a location-based social networking check-in service such as, for example, FOURSQUARE, GOOGLE CHECK-INS, FACEBOOK PLACES, etc., and/or a proprietary service. The venue screen 1250, as illustrated in FIG. 15, includes a check-in field 1252. The check-in field 1252 may allow a user to enable automatic check-in at the selected venue, for example, by selecting the field 1252. FIG. 17 is a screen shot showing another embodiment of the user interface 1200 with an automatic check-in feature enabled. As illustrated in FIG. 17, check-in field 1252 may indicate that the check-in feature is enabled. In some embodiments, the check-in field may comprise a cancel button 1253, allowing the user to disable automatic check-in after it has been enabled.

Figure 18:
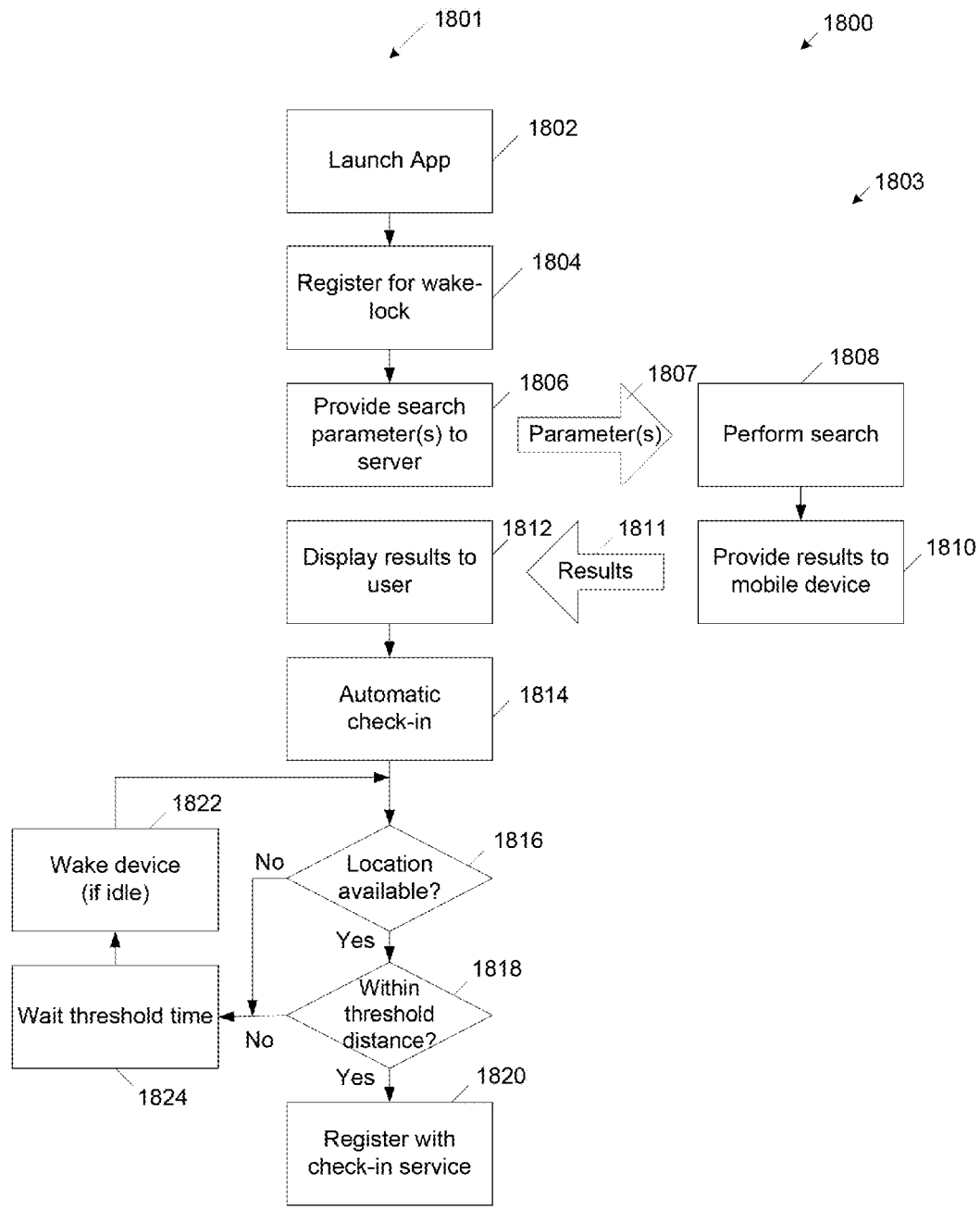
FIG. 18 is a flow chart showing one embodiment of a process flow for implementing an automatic check-in feature.

FIG. 18 is a flow chart showing one embodiment of a process flow 1800 for implementing an automatic check-in feature. The actions described in the process flow 1800 may be performed, for example, by any combination of the mobile computing device 102 and/or the application server system 104. An example division of actions between the mobile computing device 102 and the application server system 104 is indicated by columns 1801 and 1803. Actions that may be performed by the mobile computing device 102 (e.g., under the direction of the app 206) are shown in column 1801, while actions that may be performed by the application server system 104 (e.g., under the direction of the check-in module 214) are shown in column 1803.

At 1802, the mobile computing device 102 may launch the app 206. At 1804, the mobile computing device 102 (e.g., through the app 206) may, optionally, register for wake-lock privileges. Wake lock-privileges may allow the app 206 to "awaken" the mobile computing device 102 (e.g., the processor 302) if the device 102 has become idle. For example, registering for wake lock may comprise the app 206 registering a request (e.g., via the services layer 404). In some embodiments (e.g., in some operating system) such a registration may not be necessary.

At 1806, the mobile computing device 102 may provide at least one search parameter 1807 to the application server system 104. The application server system 104 may receive the search parameter 1807 and perform a search of the venue information 221 at 1808. The application server system 104 may further, at 1810, provide results 1811 of the search to the mobile computing device 102. The mobile computing device 102 may display the results 1811 to the user at 1812. Steps 1806, 1808, 1810 and 1812 may be similar to various other searches described herein and displayed to the user utilizing the interface 1200 described herein. In various embodiments, the results may include, for each returned venue, an indication of a neighborhood of the venue, a distance from the venue to a search location or geographic search center, etc. Also, in some embodiments, a search per 1806, 1808, 1810 and 1812 may be omitted. For example, the mobile computing device 102 may receive an indication of a selected venue directly from the user.

At 1814, the mobile computing device may receive from the user an indication to enable automatic check-in for a selected venue included in the results 1811. For example, the user may indicate that automatic check-in should be enabled utilizing the field 1252 described herein above. At 1816, the mobile computing device 102 may determine whether its location is available, for example, according to the process flow 900 described herein above. If the location is available, the mobile computing device 102 may determine whether its location is within a threshold distance of the location of the selected venue. The location of the selected venue may be received, for example, from the application server system 104 as part of a search result or in response to an independent query. The threshold may be any suitable threshold indicating that the mobile computing device either is present at, or very close to the location of the selected venue. For example, the threshold distance may be three hundred meters. If the mobile computing device 102 is within the threshold distance of the selected venue location, the mobile computing device 102 may check-in the user with the check-in service at 1820. Checking-in the user may comprise, for example, sending a message to the application server system 104, sending a message to a third-party server, and/or sending a peer-to-peer message to a group of other users indicating that the user has arrived at the selected venue. If the mobile computing device 102 is not within the threshold distance and/or if no location was available at 1816, the mobile computing device may wait a delay time (e.g., five minutes) at 1824. If, at the expiration of the delay time, the mobile computing device 102 is idle or inactive (e.g., in a sleep mode), it may be awakened, as described above, at 1822. The mobile computing device 102 may continue to execute actions 1816, 1818, 1824 and, optionally, 1822, until check-in occurs.

Figure 19:
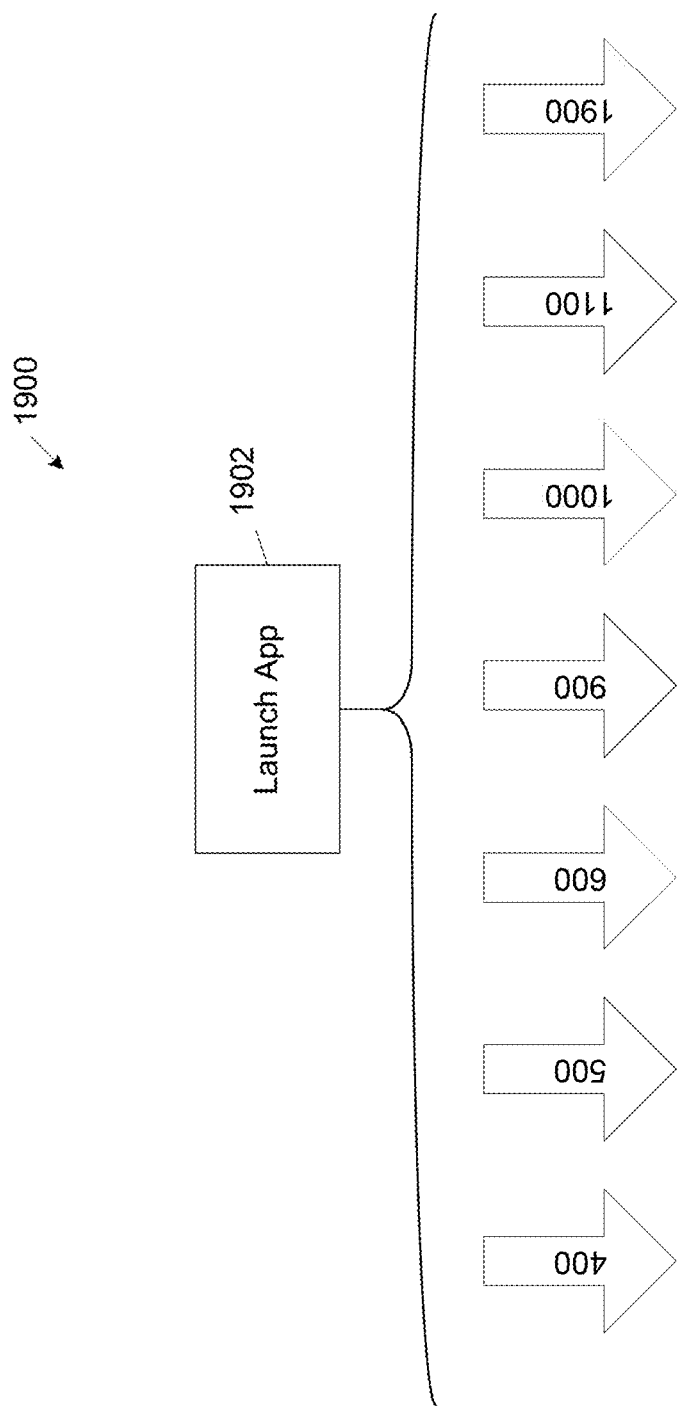
FIG. 19 is a flow chart illustrating one embodiment of a process flow for executing the app of FIG. 2.

FIG. 19 is a flow chart illustrating one embodiment of a process flow 1900 for executing the app 206. The process flow 1900 may be executed by the mobile computing device 102 and/or application server system 104. At 1902, the mobile computing device 102 may launch the app 206, for example, in response to a request and/or command from the user. In some embodiments, the mobile computing device 102 may be configured to launch the app 206 automatically upon start-up. Upon launch, the app 206 may cause the mobile computing device 102 to perform any of the process flows described herein including, for example, 400, 500, 600, 900, 1000, 1100 and 1800. Not all embodiments of the app 206 will perform all of the process flows described herein. Also, it will be appreciated that, in some embodiments, some or all of the process flows described herein, or groupings thereof, may be implemented by the mobile computing device 102 based on the execution of separate apps.

Figure 20:
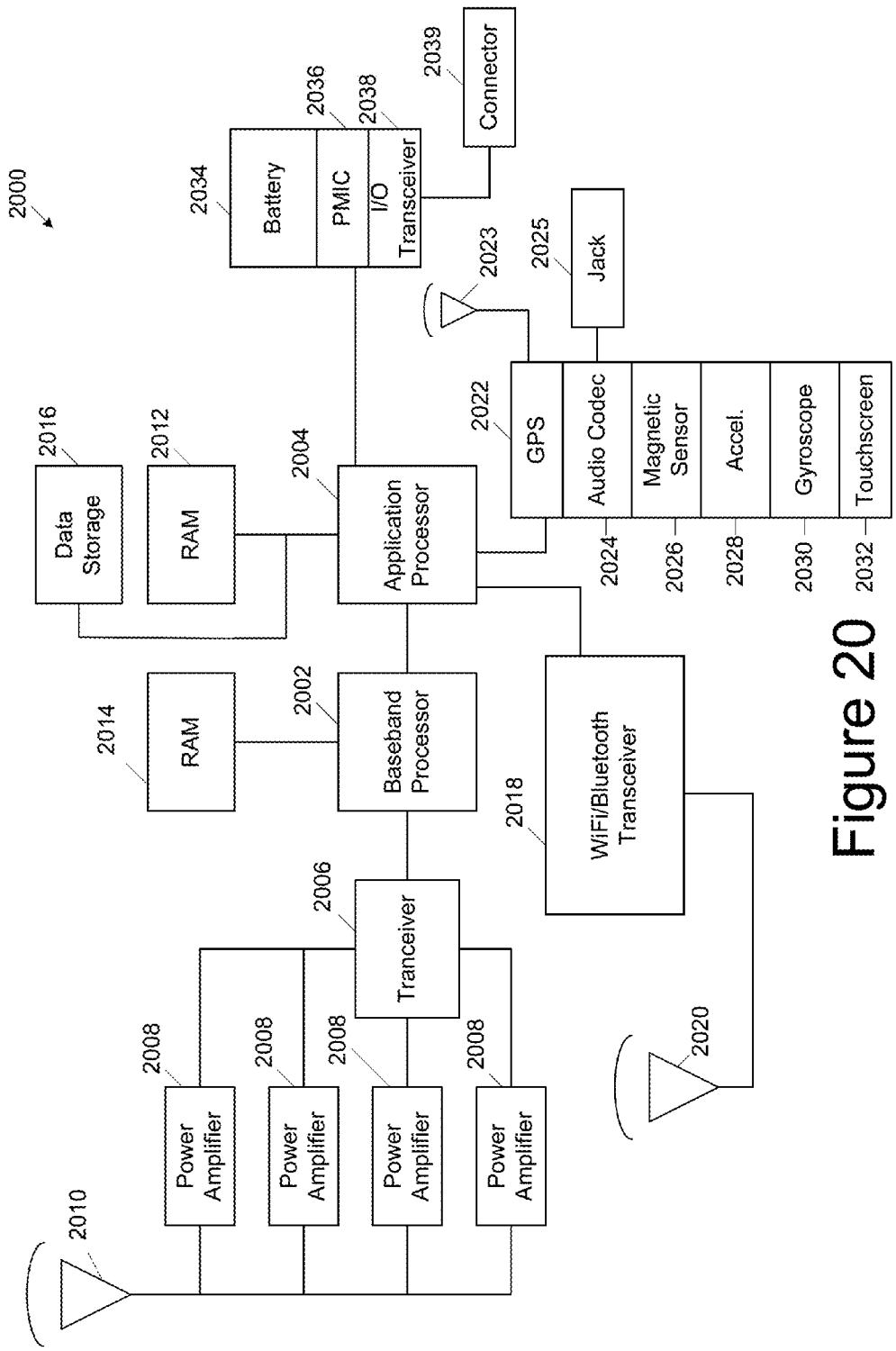
FIG. 20 is a system diagram of one embodiment of an example architecture for a mobile computing device.

Having thus described various novel features of the app 206, additional details of example hardware and software architectures for the mobile computing device 102 are provide below. For example, FIG. 20 is a system diagram of one embodiment of an example architecture 2000 for the mobile computing device 102. The example architecture 2000 is similar to that of the iPHONE 4 available from APPLE, INC. The architecture 2000 may comprise multiple processors 2002, 2004. A baseband processor 2002 may handle communication over a mobile telecommunications network. The baseband processor 2002 may comprise dedicated random access memory (RAM) 2014. In various embodiments, the baseband processor 2002 may be in communication with a transceiver 2006. The transceiver 2006 may, subsequently, be in communications with one or more power amplifiers 2008 and an antenna 2010. Outgoing signals may be processed at baseband by the baseband processor 2002 and provided to the transceiver 2006. The transceiver 2006 and/or the baseband processor 2006 may modulate the outgoing signal to a carrier frequency. One or more of the amplifiers 2008 may amplify the outgoing signal, which may be subsequently transmitted via antenna 2010. Incoming signals may be received by the antenna 2010, amplified by one or more of the amplifiers 2008 and provided to the transceiver 2006. Either the transceiver 2006 or the baseband processor 2002 may demodulate the incoming signal to baseband.

An applications processor 2004 may execute an operating system (as described herein below) as well as applications or apps, such as the app 2006. In various embodiments, the applications processor 2004 may be from the APPLE A4 line of processors. The applications processor 2004 may be in communications with applications RAM 2012, and non-volatile data storage 2016. The applications processor 2004 may additionally be in communication with other hardware devices such as a combination WI-FI/BLUETOOTH transceiver 2018. The WI-FI/BLUETOOTH transceiver 2018 may handle radio frequency (RF) communication with a LAN (e.g., according to the WI-FI standard, or any suitable standard) or direct RF communications between the device 2000 and another wireless device (e.g., according to the BLUETOOTH standard or any suitable standard). A global positioning system (GPS) 2022 maybe in communication with a satellite-based GPS system via a GPS antenna 2023 and provides the application processor 2004 with information describing the geographic location of the device 2000. A touch screen 2032 may both provide output to the user of the device 2004 in visual form and receive input from the user.

The input may be in the form of signals representing screen-touches by the user. An audio codec module 2024 may provide hardware and/or software for decoding and playing audio signals. In some embodiments, the codec 2024 may also comprise a digital-to-analog converter. Audio output signals may be provided to a jack 2025, which may receive a set of headphones and/or speakers for playing the audio output signal.

Various other sensors may be included. A magnetic sensor 2026 may sense magnetic fields near the device. For example, the magnetic sensor 2026 may be used by various apps and/or system functionality to implement a compass. An accelerometer 2028 and gyroscope 2030 may provide data describing movement of the device. For example, data from the accelerometer 2028 and gyroscope 2030 may be used by some apps in a manner allowing movement of the device itself to be used as a controlled input to the app (e.g., similar to a mouse or joystick). In some embodiments, data from the accelerometer 2028 and gyroscope 2030 may be utilized to track the geographic location of the device, for example, in the course of providing venue information. Of course, data received from the gyroscope 2030 and accelerometer 2038 may be used for various other purposes as well, depending on the app. The architecture 2000 may be powered by a battery 2034, which may, in turn, be managed by a power management integrated circuit (PMIC) 2036. An I/O transceiver 2038 may manage wired communications between the device and other devices, for example, according to the Universal Serial Bus (USB) or any other suitable standard. A connector 2039 may facilitate wired connections. In some embodiments, connections via the connector 2039 and I/O transceiver 2038 may provide power for charging the battery 2034.

Figure 21:
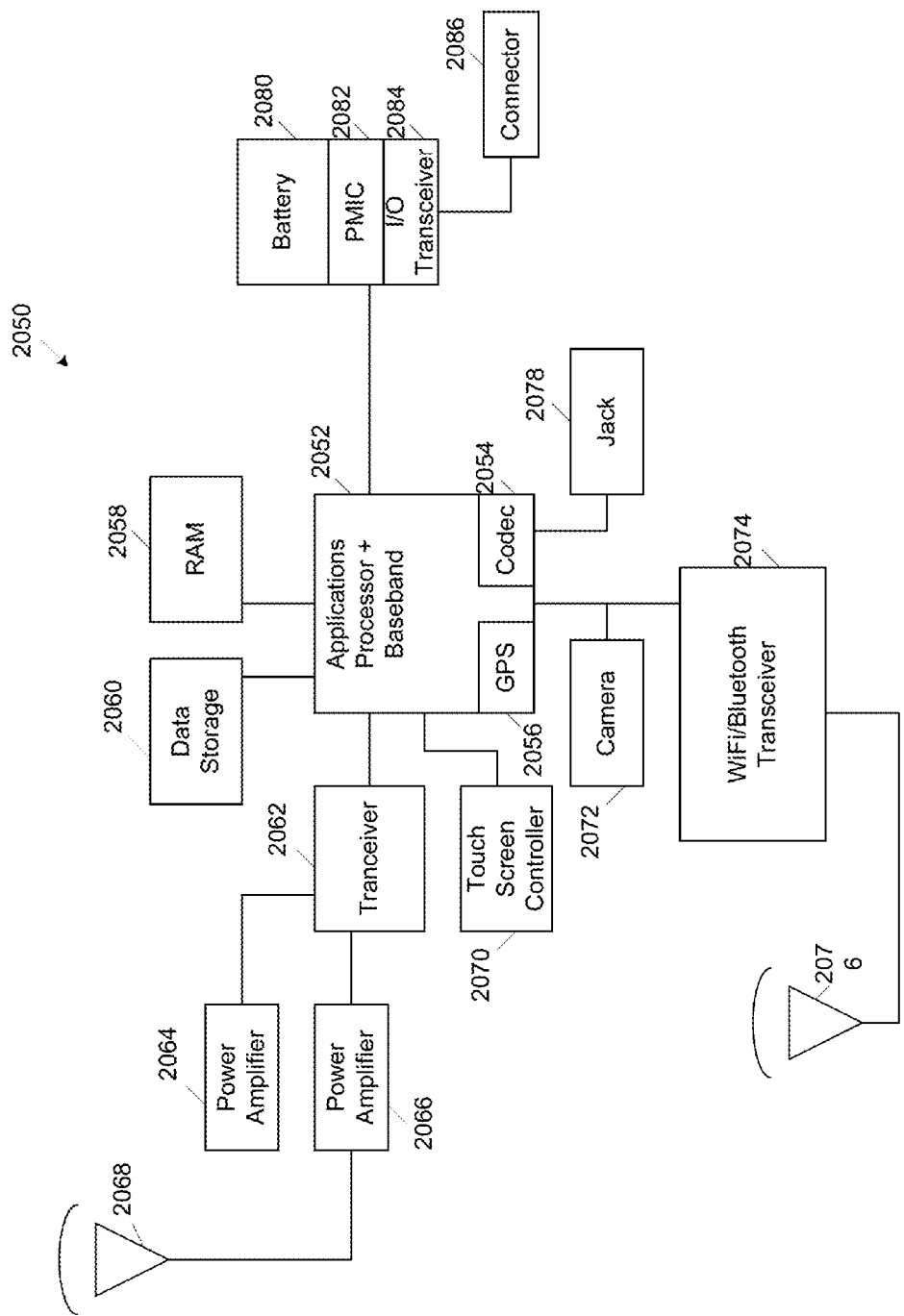
FIG. 21 is a system diagram of another embodiment of an example architecture for a mobile computing device.

FIG. 21 is a system diagram of another embodiment of an example architecture 2050 for the mobile computing device. For example, the architecture 2050 is similar to that of the DROID INCREDIBLE available from HTC CORP. A single processor 2052 may handle applications processing as well as baseband processing for mobile telecommunications. The processor 2052 may also comprise an onboard GPS module 2056 and audio codec 2054. The audio codec 2054 may be in communication with an audio jack 2078 for receiving a connection to a set of headphones and/or speakers. In various embodiments, the processor 2052 may be a model QSD8650 available from QUALCOMM, INC. The processor 2052 may also be in communication with RAM 2058 and data storage 2060, which may be utilized for various processing tasks. A touch screen controller 2070 may provide a functional interface between the processor 2052 and a touch screen display of the device.

A camera 2072 in communication with the processor 2052 may comprise appropriate hardware and/or software for providing images and/or video to the processor 2052. WI-FI/BLUETOOTH transceiver 2074 may provide LAN and/or device specific wireless communications, utilizing antenna 2076. Transceiver 2062, power amplifiers 2064, 2066 and antenna 2068 may be utilized to provide mobile telecommunications, for example, in a manner similar to that described above with respect to the architecture 2000. Power may be provided to the architecture by a battery 2080 and PMIC 2084. An I/O transceiver 2084 may manage wired connections between the device and other devices (e.g., via a connector 2086). The I/O transceiver 2084 and connector 2086 may aid in charging of the battery 2080, for example, in a manner similar to that of the architecture 2000 described above. It will be appreciated that the architectures 2000 and 2050 are provided for example purposes only. Mobile computing devices for executing the apps here may be of any suitable architecture. For example, the mobile computing device 102, described herein above, may be constructed according to the architecture 2000, the architecture 2050, or any other suitable architecture. For example, in some embodiments, the mobile device 102 may omit telephony components (e.g., transceiver 2006, 2062 and related components).

Figure 22:
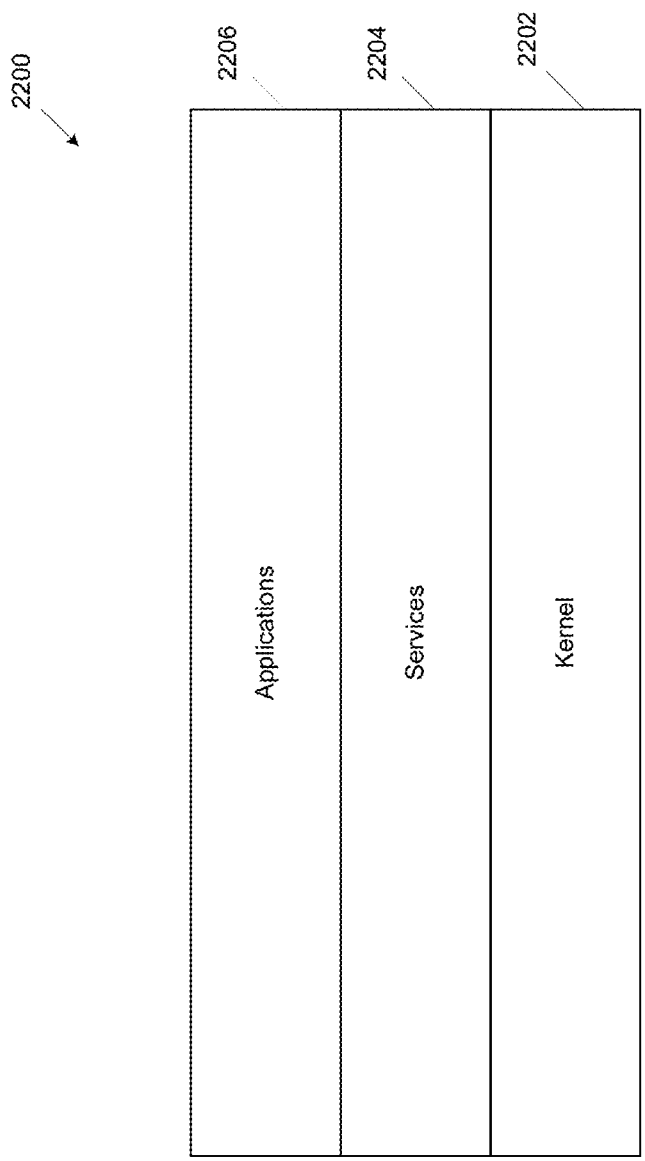
FIG. 22 is a diagram of one embodiment of an example operating system.

According to most architectures, the mobile computing device 102 executes an operating system that manages the execution of apps and provide apps with access to the various hardware and/or software modules and features of the device 102. FIG. 22 is a diagram of one embodiment of an example operating system 2200 for the mobile computing device 102. The operating system 2200 may be any suitable operating system including, for example, SYMBIAN available from ACCENTURE, I/OS available from APPLE, INC., WINDOWS MOBILE available from MICROSOFT CORPORATION, ANDROID available from GOOGLE, INC., etc. Some mobile computing devices 102 may execute operating systems that are not specifically designed for mobile computing devices such as, for example, MAC OS X available from APPLE, INC., any WINDOWS operating system available from MICROSOFT CORPORATION, LINUX, UNIX, etc.

The operating system 2200 may generally comprise a core or kernel layer 2202, a services layer 2204 and an applications layer 2206. The kernel layer 2202 may execute and/or manage low-level operations of the mobile computing device 102. For example, in some embodiments, the kernel layer 2202 may implement hardware drivers to handle low-level interactions with different hardware components such as, for example, the camera 320, positioning module 322, sensors 324, memory 304, data storage, 306, 326, communications port 316, etc. For example, the kernel layer 2202 may implement memory allocation and/or management including deriving and transmitting appropriate low-level commands for reading and writing to memory. The kernel layer 2202 may also comprise functionality for managing data storage, such as the data storage 306 and removable memory 326, etc. For example, the kernel layer 2202 may implement and/or interface with one or more file systems and may format read and write requests according to the file system or systems for each respective data storage device 306, 326. The kernel layer 2202 may also handle low-level aspects of communication between the device 102 and other computing devices (e.g., via the LAN communications module 314, communications port 316, mobile telecommunications module 312, etc.). In some embodiments, the kernel layer 2202 may also handle security aspects of communications. For example, the kernel layer 2202 may implement encryption (e.g., symmetric or asymmetric encryption) in a manner that is transparent to higher levels of the operating system 2200. In various embodiments, the kernel layer 2202 may additionally perform various processing tasks such as, for example, some types of calculation/computation (e.g., linear algebra, signal processing tasks, media manipulation tasks, etc.).

The services layer 2204 of the operating system 2200 may provide an interface between the functionality of the kernel layer 2202 and apps executing at the applications layer 2206, allowing the apps to access kernel layer functionality. For example, the services layer 2204 may comprise one or more libraries of commands and/or functions that may be called by apps to access kernel layer functionality (e.g., read and write commands, communication commands, etc.). Also, in some cases, the services layer 2204 may execute intermediate level functionality such as, for example, media players, activity monitoring, event notification, etc.

The applications layer 2206 may host applications or apps executed by the device 102 including, for example, the app

2006. Many apps implement a direct user interface to a user of the device 102. Apps may be third party apps and/or core apps associated with (and sometimes shipped with) the operating system. Example third party apps may provide venue information, for example, as described herein. Examples of core apps shipped with the ANDROID operating system include a short message service (SMS) app, a calendar app, a map app, a contacts app, an Internet browser app, etc. It will be appreciated that the mobile computing device 102 may execute any suitable operating system, and that some operating systems may have structures slightly or even considerably different than that of the operating system 2200 described above.

Various activities of the mobile computing device 102 described herein may be facilitated by an operating system architecture, such as 2200. For example, referring again to FIG. 9, at 902 and 904, the mobile computing device 102 may determine available location-functionality and query the available location functionality. Determining the available location systems of the mobile computing device 102 and querying the systems may comprise the app 2006 (e.g., executing at an applications layer 2206) utilizing an application programming interface (API) provided by the services layer 2204 to access the kernel or other low-level features of the location system(s). Also, referring again to the process flow 1900, awakening the mobile computing device 102 if it is idle may be implemented utilizing capabilities of the architecture 2200. For example, to awaken the device 102, the app 206 may cause a command to be transmitted according to an API of the services layer 2204. The command may reach the kernel layer 2202, which may generate a suitable signal (e.g., interrupt signal) to the processor 302 or other suitable hardware to awaken the device 102.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. For example, no particular aspect or aspects of the examples of system architectures, methods or processing structures described herein are necessarily intended to limit the scope of the invention.

Unless specifically stated otherwise as apparent from the preceding discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices. It should be borne in mind, however, that all of these and similar terms are to be associated with the appropriate physical quantities and are merely convenient labels applied to these quantities.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these sorts of focused descriptions would not facilitate a better understanding of the present invention, and therefore, a more detailed description of such elements is not provided herein.

In various embodiments, modules or software can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention.

Moreover, the processes associated with the present embodiments may be executed by programmable equipment, such as computers. Software or other sets of instructions may be employed to cause programmable equipment to execute the processes. The processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

A "computer," "computer system," "computing device," "host," "engine," or "processor" may be, for example and without limitation, a processor, microcomputer, minicomputer, server, mainframe, laptop, personal data assistant (PDA), wireless e-mail device, cellular phone, pager, processor, fax machine, scanner, tablet computer or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers described herein, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

Various embodiments of the systems and methods described herein may employ one or more electronic computer data networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. The network may use routers and/or public communication links One type of data communication network may cover a relatively broad neighborhood (e.g., city-to-city or country-to-country) which uses transmission facilities provided by common carriers, such as telephone service providers. In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs); remote bridges can be used to create a wide area network (WAN) link between LANs; and/or, wireless bridges can be used to connect LANs and/or to connect remote stations to LANs.

In various embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is in turn connected to a switch. The term "switch" can also include routers and bridges, as well as other devices that distribute data traffic by application content (e.g., a Web URL identifier). Switches may operate at one or more OSI model layers, including physical, data link, network, or transport (i.e., end-to-end). A device that operates simultaneously at more than one of these layers can be considered a multilayer switch. In certain embodiments, routers or other like networking devices may be used to forward data packets between networks using headers and forwarding tables to determine an optimum path through which to transmit the packets.

As employed herein, an application server, or application server system, may be a server that hosts an API to expose venue logic and venue processes for use by other applications. Examples of application server systems include J2EE or Java EE 5 application server systems including WebSphere Application Server. Other examples include WebSphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java). Also, application server systems may be provided in accordance with the .NET framework, including the Windows Communication Foundation, .NET Remoting, ADO.NET, and ASP.NET among several other components. For example, a Java Server Page (JSP) is a servlet that executes in a web container which is functionally equivalent to CGI scripts. JSPs can be used to create HTML pages by embedding references to the server logic within the page. The application server systems may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

While various embodiments of the invention have been described herein, it should be apparent, however, that various modifications, alterations and adaptations to those embodiments may occur to persons skilled in the art with the attainment of some or all of the advantages of the present invention. The disclosed embodiments are therefore intended to include all such modifications, alterations and adaptations without departing from the scope and spirit of the present invention as set forth in the appended claims.

We claim:

1. A computer-implemented method for checking in at a venue with a mobile computing device, the method comprising:
receiving, by the mobile computing device via a data network, location information for the venue, wherein the mobile computing device comprises at least one processor and operatively associated memory, and wherein the mobile computing device comprises a graphical user interface that provides the user of the mobile computing device with an pre-check-in option to pre-check-in to the venue;
determining, by the mobile computing device, whether real-time location information for the mobile computing device is available;

conditioned upon the real-time location information of the mobile computing device not being available or the mobile computing device not being within the threshold distance of the venue:
  setting a timer of the mobile computing device to a predetermined time period; and
  determining whether real-time location information of the mobile computing device is available upon expiration of the predetermined time period;
conditioned upon the real-time location information of the mobile computing device being available, determining, by the mobile computing device, whether the mobile computing device is within a threshold distance of the venue; and
conditioned upon the mobile computing device being presently within the threshold distance of the venue, sending, by the mobile computing device via the data network, a check-in message to a server associated with a social networking check-in Internet service when the mobile computing device is within the threshold distance of the venue only when the pre-check-in option is selected, wherein the check-in message indicates that the user of the mobile computing device is at the venue.

2. The method of claim 1, wherein determining whether the real-time location information of the mobile computing device is available upon expiration of the predetermined time period comprises waking the at least one processor of the mobile computing device from sleep mode at the expiration of the predetermined time period.

3. The method of claim 1, wherein the location information for the venue is received by the mobile computing device via the data network in response to a search query from the user of the mobile computing device.

4. The method of claim 3, wherein:
  a response to the search queries comprises a plurality of results; and
  the mobile computing device displays the results on the graphical user interface to the user and receives a selection of the venue by the user from the plurality of results.

5. The method of claim 1, wherein determining whether real-time location information of the mobile computing device is available comprises:
  receiving from a location system of the mobile computing device data comprising (i) a potential location of the mobile computing device; and (ii) accuracy information for the potential location information; and
  determining that the potential location is reliable for use when the accuracy information indicates that the potential location is within a threshold accuracy.

6. The method of claim 1, wherein the venue comprises a business location.

7. The method of claim 1, wherein the threshold distance is 300 meters.

8. A programmed mobile computing device for checking in at a venue, the programmed mobile computing device comprising:
  at least one processor;
  a graphical user interface that provides the user of the mobile computing device with an pre-check-in option to pre-check-in to the venue and
  a memory associated with the at least one processor, wherein the mobile computing device is programmed to:
    receive via a data network, location information for the venue;
    determine whether real-time location information for the mobile computing device is available;
    conditioned upon the real-time location information of the mobile computing device not being available or the mobile computing device not being within the threshold distance of the venue:
      set a timer of the mobile computing device to a predetermined time period; and
      determine whether real-time location information of the mobile computing device is available upon expiration of the predetermined time period;
    conditioned upon the real-time location information of the mobile computing device being available, determine whether the mobile computing device is within a threshold distance of the venue; and
    conditioned upon the mobile computing device being presently within the threshold distance of the venue, send via the data network, a check-in message to a server associated with a social networking check-in Internet service, wherein the check-in message indicates that the user of the mobile computing device is at the venue.

9. The system of claim 8, wherein determining whether the real-time location information of the mobile computing device is available upon expiration of the predetermined time period comprises waking the at least one processor of the mobile computing device from sleep mode at the expiration of the predetermined time period.

10. The system of claim 8, wherein the location information for the venue is received by the mobile computing device via the data network in response to a search query from the user of the mobile computing device.

11. The system of claim 10, wherein:
  a response to the search queries comprises a plurality of results; and
  the mobile computing device displays the results on the graphical user interface to the user and receives a selection of the venue by the user from the plurality of results.

12. The system of claim 8, wherein determining whether real-time location information of the mobile computing device is available comprises:
  receiving from a location system of the mobile computing device data comprising (i) a potential location of the mobile computing device; and (ii) accuracy information for the potential location information; and
  determining that the potential location is reliable for use when the accuracy information indicates that the potential location is within a threshold accuracy.

13. The system of claim 8, wherein the venue comprises a business location.

14. The system of claim 8, wherein the threshold distance is 300 meters.

15. A computer-implemented method for checking in at a venue with a mobile computing device, the method comprising:
  receiving, by the mobile computing device via a data network, location information for the venue, wherein the mobile computing device comprises at least one processor and operatively associated memory;
  determining, by the mobile computing device, whether real-time location information for the mobile computing device is available, wherein determining whether the real-time location information is available comprises:
    receiving from a location system of the mobile computing device data comprising (i) a potential location of the mobile computing device; and (ii) accuracy information for the potential location information; and determining that the potential location is reliable for use when the accuracy information indicates that the potential location is within a threshold accuracy;

conditioned upon the real-time location information of the mobile computing device being available, determining, by the mobile computing device, whether the mobile computing device is within a threshold distance of the venue; and conditioned upon the mobile computing device being presently within the threshold distance of the venue, sending, by the mobile computing device via the data network, a check-in message to a server, wherein the check-in message indicates that the user of the mobile computing device is at the venue.

16. The method of claim 15, wherein the server to which the check-in message is sent comprises a server associated with a social networking check-in Internet service.

17. The method of claim 16, wherein:
the mobile computing device comprises a graphical user interface;
the graphical user interface provides the user of the mobile computing device with an pre-check-in option to pre-check-in to the venue; and
the mobile computing device sends the check-in message to the server when the mobile computing device is within the threshold distance of the venue only when the pre-check-in option is selected.

18. A programmed mobile computing device for checking in at a venue, the programmed mobile computing device comprising:
at least one processor; and
a memory associated with the at least one processor, wherein the mobile computing device is programmed to:
receive via a data network, location information for the venue;
determine whether real-time location information for the mobile computing device is available, wherein determining whether the real-time location information is available comprises:
receiving from a location system of the mobile computing device data comprising (i) a potential location of the mobile computing device; and (ii) accuracy information for the potential location information; and
determining that the potential location is reliable for use when the accuracy information indicates that the potential location is within a threshold accuracy;
conditioned upon the real-time location information of the mobile computing device being available, determine whether the mobile computing device is within a threshold distance of the venue; and
conditioned upon the mobile computing device being presently within the threshold distance of the venue, send via the data network, a check-in message to a server, wherein the check-in message indicates that the user of the mobile computing device is at the venue.

19. The system of claim 18, wherein the server to which the check-in message is sent comprises a server associated with a social networking check-in Internet service.

20. The system of claim 19, wherein:
the mobile computing device comprises a graphical user interface;
the graphical user interface provides the user of the mobile computing device with an pre-check-in option to pre-check-in to the venue; and
the mobile computing device sends the check-in message to the server when the mobile computing device is within the threshold distance of the venue only when the pre-check-in option is selected.

* * * * *